United States Patent [19]

Nakagawa

[11] Patent Number: 5,621,414
[45] Date of Patent: Apr. 15, 1997

[54] LOCATION CONFIRMING SYSTEM

[75] Inventor: Yoshikatsu Nakagawa, Yamato, Japan

[73] Assignee: Ricoh Company, Ltd., Tokyo, Japan

[21] Appl. No.: 257,678

[22] Filed: Jun. 8, 1994

[30] Foreign Application Priority Data

Jun. 8, 1993 [JP] Japan .................................. 5-163966
Dec. 9, 1993 [JP] Japan .................................. 5-308909

[51] Int. Cl.$^6$ ................................................. G01S 1/00
[52] U.S. Cl. .................... 342/350; 342/463; 342/457; 455/33.1
[58] Field of Search ................... 342/463, 457, 342/465, 460, 464, 350; 455/33.1

[56] References Cited

U.S. PATENT DOCUMENTS

| | | | |
|---|---|---|---|
| 3,757,340 | 9/1973 | Rogoff | 343/112 R |
| 4,651,156 | 3/1987 | Martinez | 342/457 |
| 5,045,861 | 9/1991 | Duffett-Smith | 342/457 |
| 5,144,315 | 9/1992 | Schwab et al. | 342/49 |
| 5,235,633 | 8/1993 | Dennison et al. | 379/60 |
| 5,280,295 | 1/1994 | Kelly et al. | 342/463 |

*Primary Examiner*—Thomas H. Tarcza
*Assistant Examiner*—Dao L. Phan
*Attorney, Agent, or Firm*—Oblon, Spivak, McClelland, Maier & Neustadt, P.C.

[57] ABSTRACT

It is enabled to perform the location confirmation as precisely as possible at a small number of receiving stations. In the respective stations, after performing the operation of filtering and amplifying at the front end portion, the signal passes through the discriminating portion corresponding to the transmission signal from the transmitter. Thereafter, the electric power or amplitude of the signal emitted from each transmitter is measured. The measured value is sent to the central station through the backbone communication network. The more the transmission distance of the electric wave is, the more the electric wave attenuates.

Consequently, it is possible to know the zone in which the worker carrying the transmitter is staying nearby by respectively comparing with each other the electric powers of the respective signals; a, b, and c transmitted from the transmitters a–c measured by the respective receivers.

The transmitters generating the specific signals respectively are given to the respective workers, and it is possible to estimate the zone in which the worker is staying and to confirm the location of the worker by giving the receiver in each zone a function of discriminating all of those signals from the others.

25 Claims, 23 Drawing Sheets

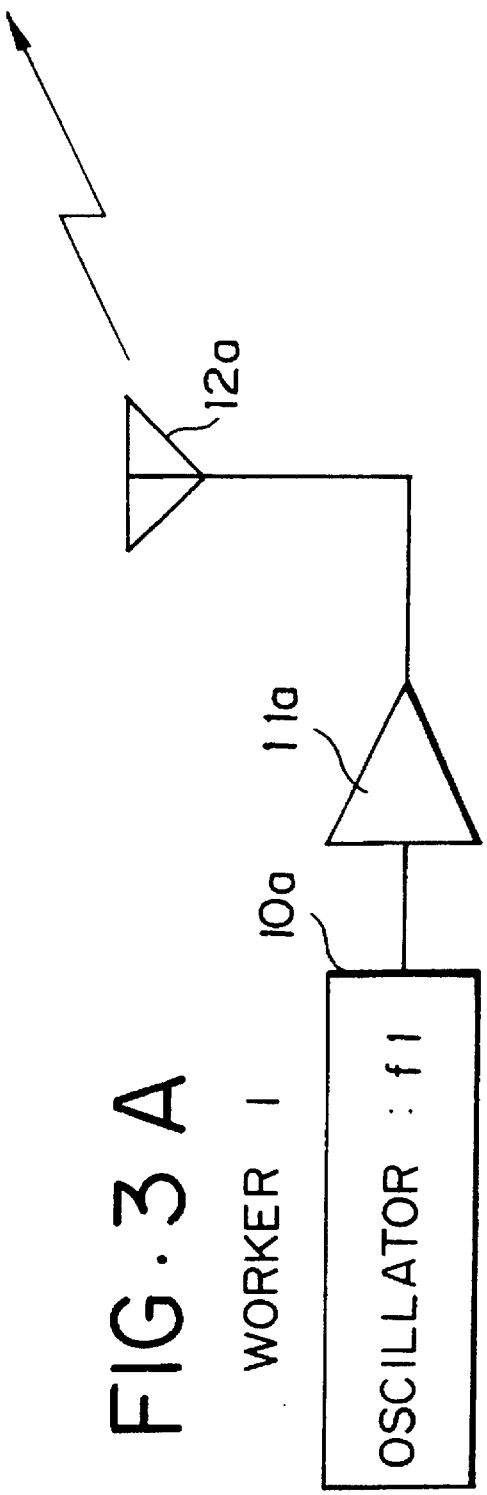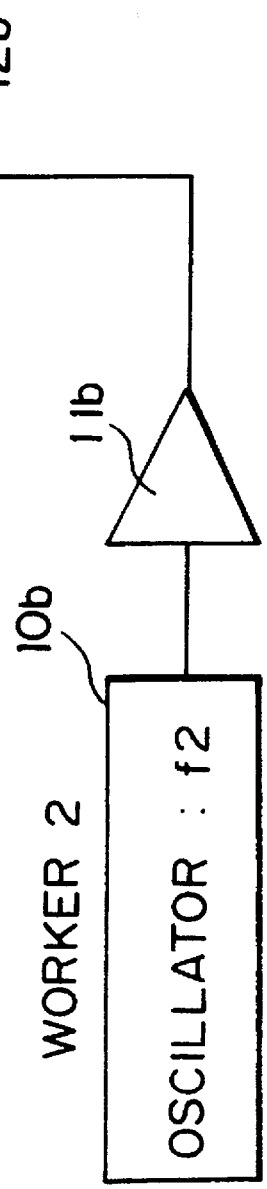

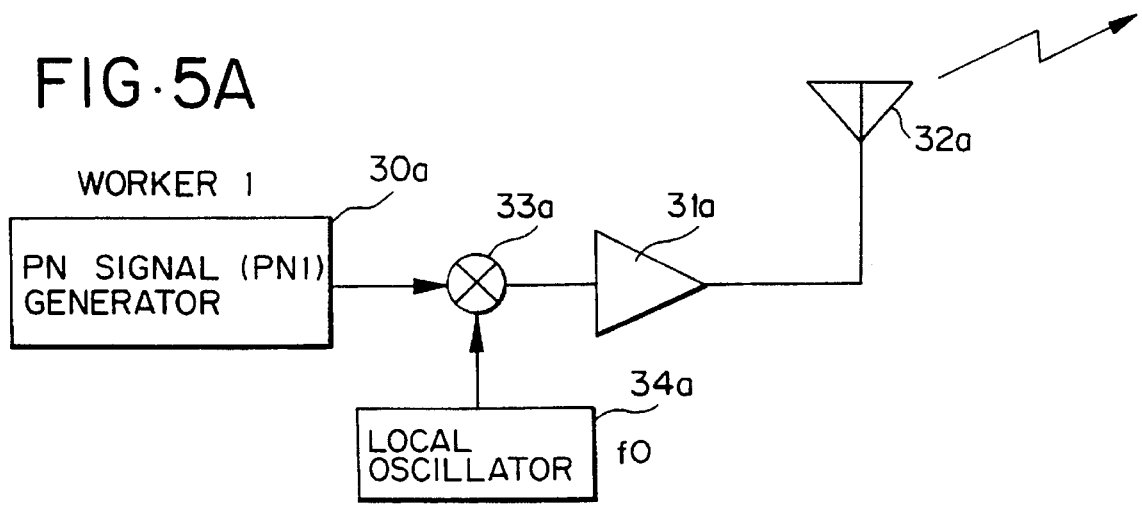
FIG·5A
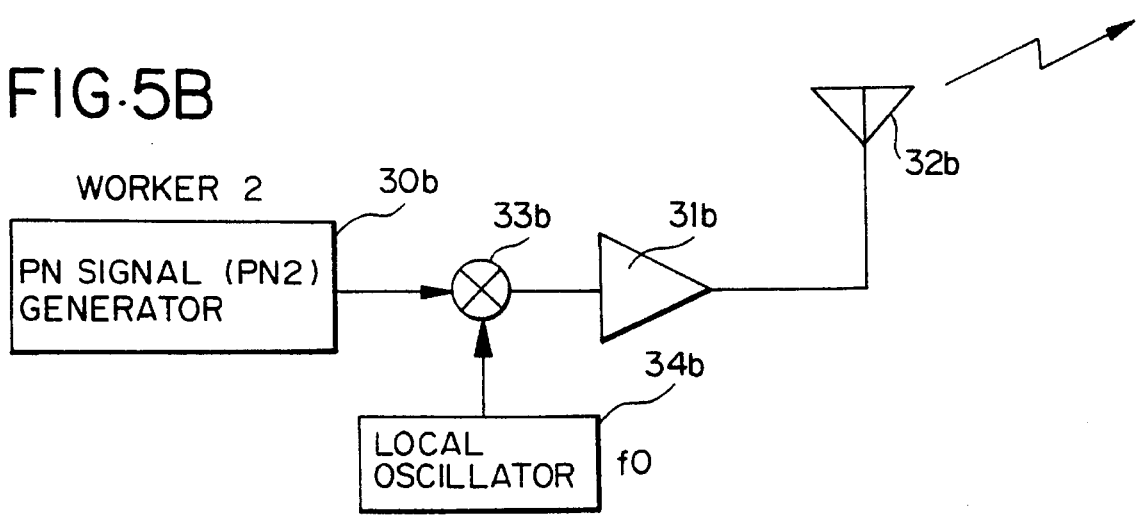
FIG·5B

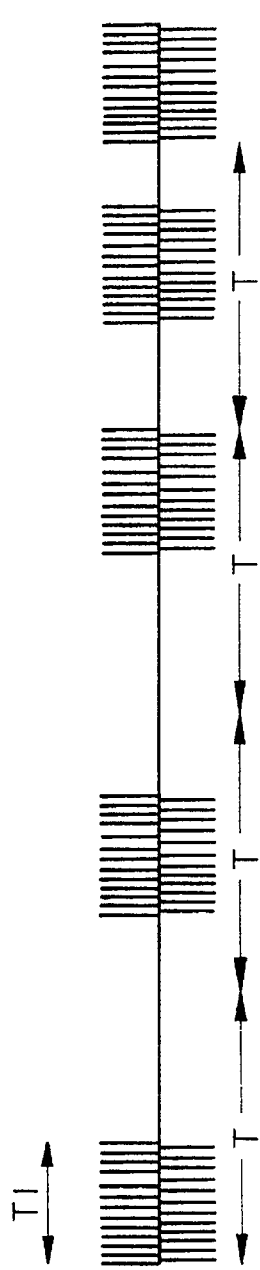
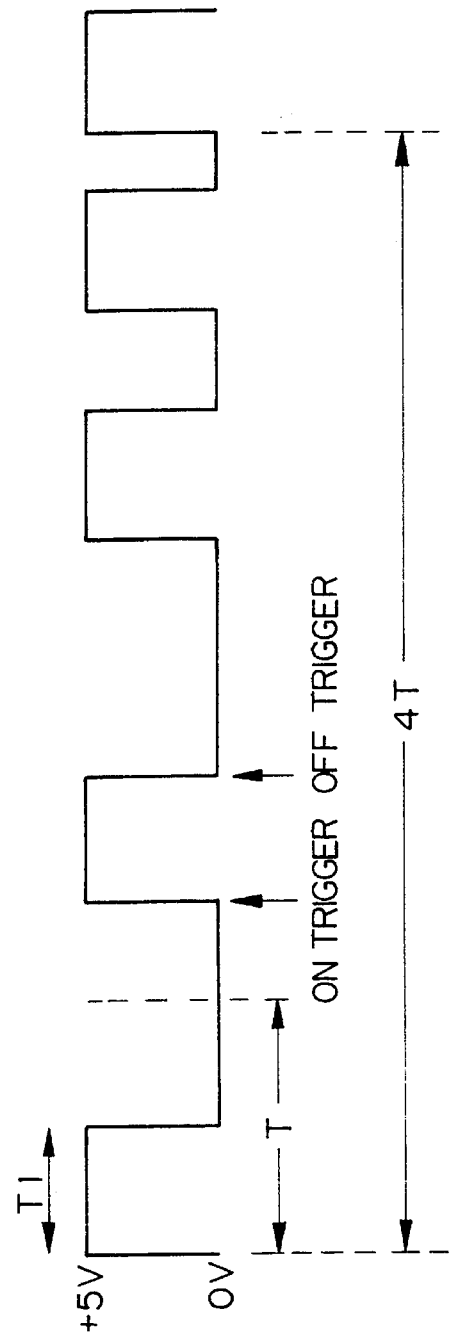
Fig. 17a
Fig. 17b

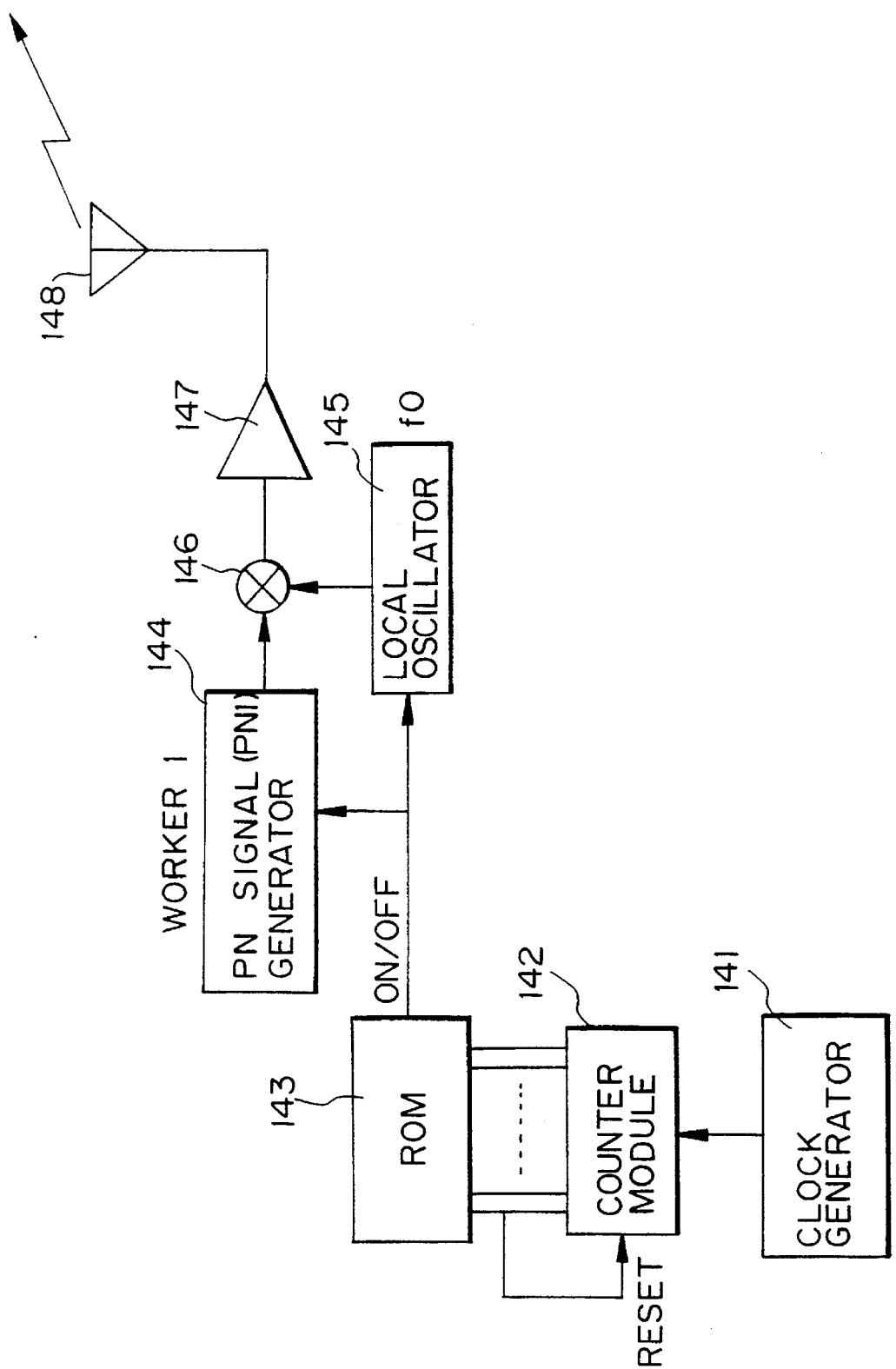

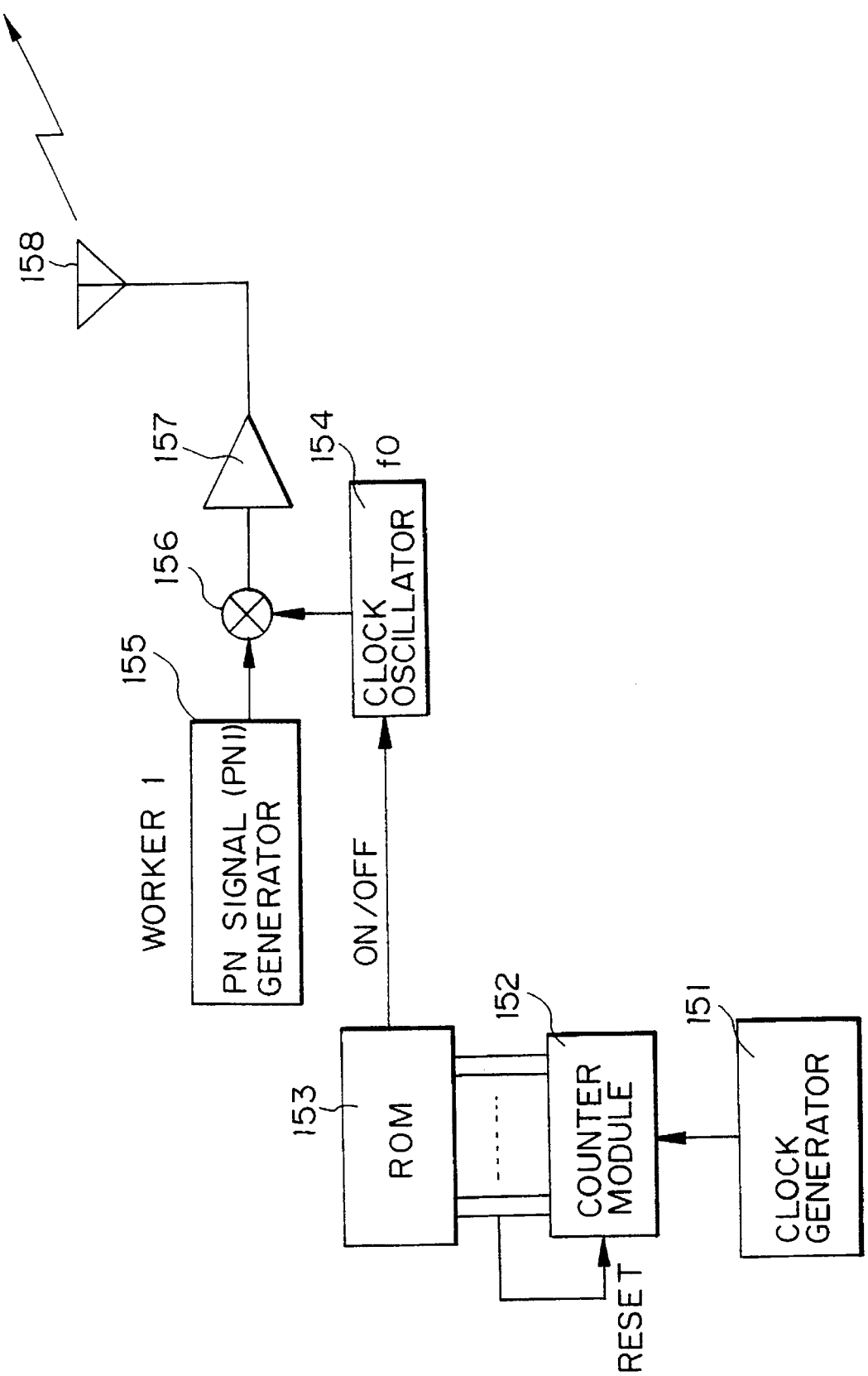

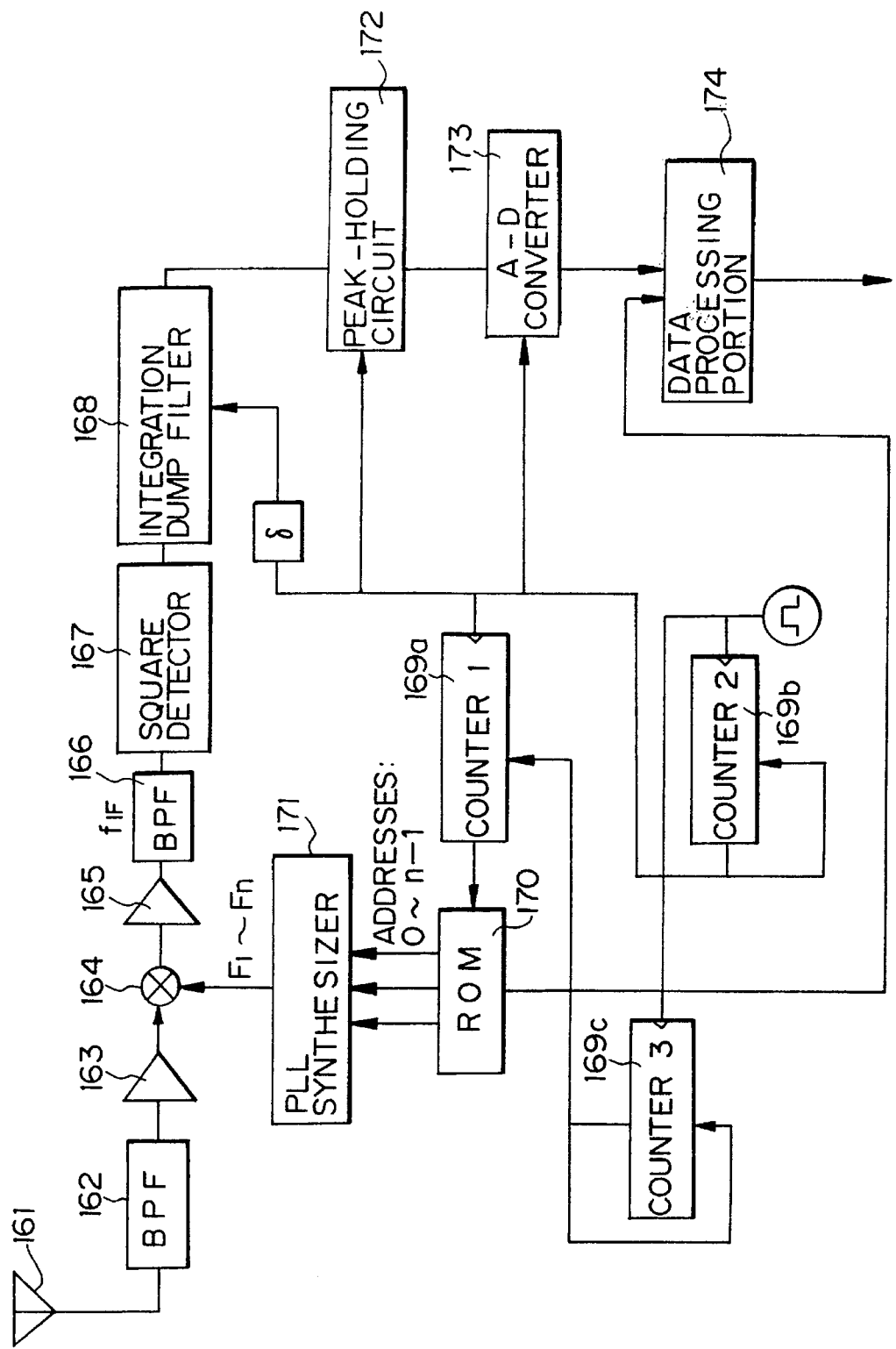

LOCATION CONFIRMING SYSTEM

BACKGROUND OF THE INVENTION

1. Field of the Invention

The present invention relates to a location confirming system, in particular, a location confirming system which is a system performing confirmation of location based upon a presumption measure mutually comparing electric power or amplitude of signals received at the respective receiving station as a system capable of performing location confirming as accurately as possible with a small number of receiving stations. The location confirming system is constructed with a transmitting measure in transmitter and a receiving measure in receiver. For instance, the system can be applied to an indoor wireless communication, movable-body communication, personal communication, and so on.

2. Description of the Prior Art

As for the prior-art, for instance, "An Outline of an Optical message communication System (CANS) and Future Business Development" (Author; Kohji Nagata, Business Communication, '91 Vol. 28 No. 1, pp. 128–135) is one of the prior-art documents. The above document relates to a system employing infrared light rays, and the system comprises an ID pen or a message card carried by respective workers and an optical tranceiver (transmitter/receiver) and an optical sensor both installed on the ceiling. Further, the same performs not only bilateral(two-way)-direction communication by use of the optical transceiver but confirmation (locating) of the residence by use of the optical sensor.

Various systems utilizing an electric wave or infrared light rays have been proposed hitherto, as a location confirming system. In those system, plural receivers are installed indoors on the ceiling at adequate intervals, and the receivers receive a discrimination signal transmitted from an object worker in order to confirm the location of the object worker.

In such conventional system, a method of judgment in which the receivers are distributed such that the signal transmitted from the object worker is received only by one of the plural receivers and thereby the existence of the worker near the receiver has been employed hitherto. However, the receiving directivity of the respective receivers has to be made acute in order to perform location confirming accurately, and nevertheless it accordingly turns out to be necessary to install a large number of receivers at the required locations. For instance, in the system example described in the reference document, the optical sensor employed for confirming location performs transmitting and receiving within the area of a circle with the radius of 1–2 m.

FIG. 23 is a conceptional diagram showing the conventional location confirming system. As shown in FIG. 23, transmitters such as infrared sensors or antennas are installed at several parts of the ceiling on the corridor or the entrance or ceiling of the room. When an object to be sensed, for instance, an office worker approaches to or pass through those sensors or antennas, the signals transmitted from each of the transmitters carried by the worker are received by the receiver.

The location of the object to be sensed is confirmed by reading out the discrimination data among the received signals. Since, in such conventional system, it is an object of the invention to confirm the existence or non-existence of the object (to be sensed) at the location where the sensor or antenna is installed, the distance between the respective receiving stations has to be sufficiently large (separated) such that the signal from the worker can be prevented from being simultaneously received by the respective receivers installed at two places.

Especially, in the case of employing the electric wave, since only very rough location presuming can be done, the system is ill-fitted for confirming location in a wide space such as a large room in the office. On the other hand, in the case of employing the infrared light rays, it is necessary to install a large number of receivers longitudinally and transversely within the area for sensing the object. The above-mentioned matters are the defects of the prior art.

SUMMARY OF THE INVENTION

The present invention is made in consideration of the above-mentioned actual circumstances.

It is an object of the present invention to solve the afore-mentioned points at issue.

It is another object of the present invention to enable the system to perform location confirming as accurately as possible with a small number of receiving stations.

It is still another object of the present invention to provide a location confirming system which is a system performing confirmation of location based upon a presumption measure mutually comparing electric power or amplitude of signals received at the respective receiving station as a system capable of performing location confirming as accurately as possible with a small number of receiving stations.

It is still another object of the present invention to provide such location confirming system constructed with a transmitting measure in the transmitter and a receiving measure in the receiver.

It is still another object of the present invention to provide such location confirming system applied to an indoor wireless communication, movable-body communication, personal communication, and so on.

It is still another object of the present invention to enable the receiver in the location confirming system to be simplified.

It is still another object of the present invention to enable the efficiency of the receiver in the location confirming system to be improved.

It is still another object of the present invention to provide such location confirming system having a simplified receiver, the efficiency of which is improved.

It is still another object of the present invention to provide such location confirming system having a simplified receiver, the efficiency of which is improved.

BRIEF DESCRIPTION OF THE DRAWINGS

FIG. 3 is a block diagram showing a construction of the transmitter according to the present invention;

FIG. 5 is a block diagram showing another construction of the transmitter according to the present invention;

FIGS. 17a–17b are diagrams showing waveforms of the transmitting signal according to the present invention.

FIG. 18 is a block diagram showing still another construction of the transmitter according to the present invention;

FIG. 20 is a block diagram showing still another construction of the transmitter according to the present invention;

FIG. 21 is a block diagram showing still another construction of the receiver according to the present invention;

DETAILED DESCRIPTION OF THE PREFERRED EMBODIMENTS

Figure 1:
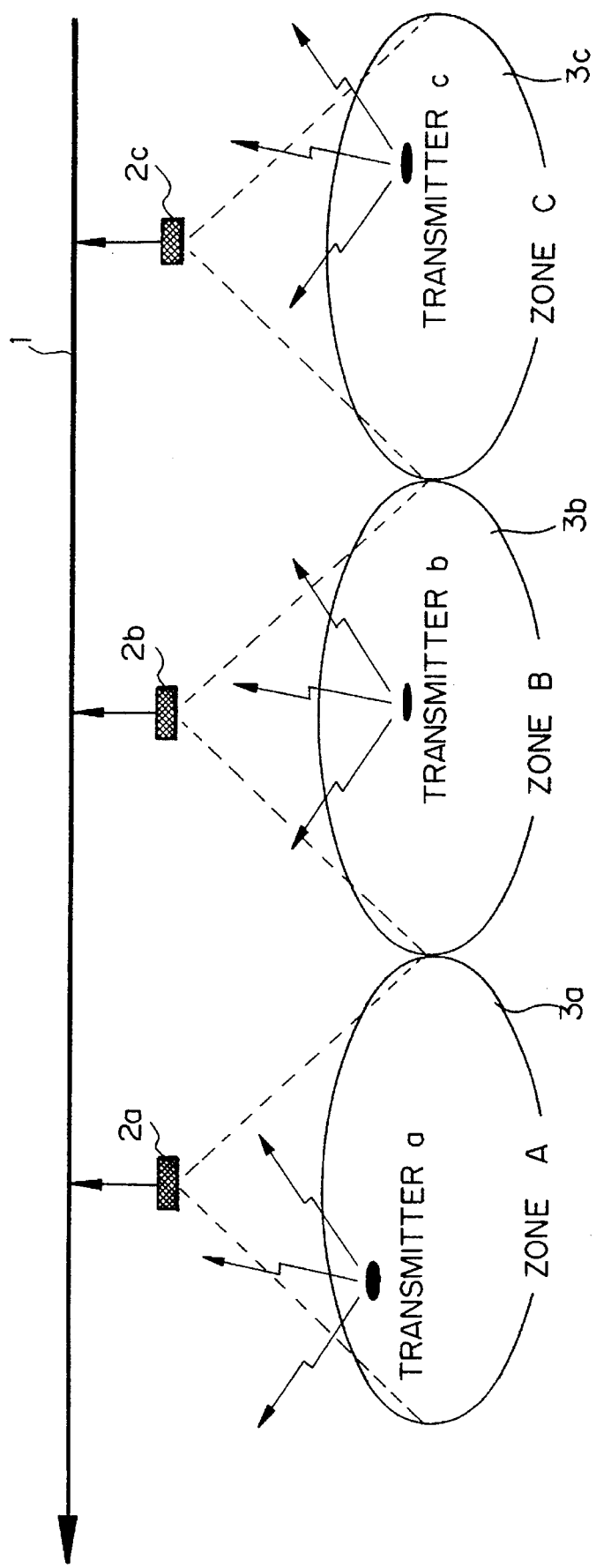
FIG. 1 is a diagram showing a construction of the respective zones in a location confirming system according to the present invention.

The present invention solved the above-mentioned subject matters by means of a location confirming system. Construction:

In order to attain the above-mentioned objects, the present invention provides a location confirming system as described hereinafter.

(1) The system comprises a presumption measure in which movable objects existing in a limited area carry a transmitter emitting a signal respectively having an inherent property, the respective signals emitted from the respective transmitters are monitored and received at plural message receiving stations arranged in accordance with an optional zone construction, and the zone in which the transmitter included in the respective objects exists is presumed by comparing the magnitude of the received signals' electric power with that of the other signal at the respective receiving stations.

(2) And further, the system comprises an existing-area zone presuming measure in which the above-mentioned objects allocate and successively emit a transmission wave of different frequencies as a signal to be transmitted, and the receiving stations of the respective zones prepare the filters of same number as that of the allocated frequency and thereby separate the signals of the respective objects, electric power or amplitude of those received signals are compared with each other at the respective receiving stations and thereby the zone in which the object should exist is decided.

(3) And further, the system comprises an existing-area zone presuming measure in which the transmission wave of the same frequency is employed, the transmitter owned by each object successively transmits the signal diffusively modulated (treated with spread spectrum modulation) with the suspected (pseudo) noise code inherent in each object, the receiving station in each zone performs correlative calculation for the suspected noise signal same as that allocated to each object as a reference signal, and the zone in which the object should exist is decided by comparing the calculated value with the other value between the respective receiving stations per each suspected noise signal.

(4) And further, the system comprises a transmitting measure in the location confirming system for intermittently operating the transmitter owned by each object employing the presuming measure described in (2) or (3) at the time interval corresponding to the time period required for the object to be measured to move in the zone.

(5) And further, the system comprises a receiving measure which is a receiving station of the location confirming system for confirming the location by use of the presuming measure described in (2) or (3) employing the transmitting measure described in (4) and determines the existing-area zone by measuring the electric power or amplitude of the signal intermittently received from the afore-mentioned respective objects during the time period when the transmitting operation is performed.

(6) And further, the system comprises an existing-area zone presuming measure in which inherent discrimination data are allocated to the afore-mentioned respective objects, the transmission wave of the same frequency which is data-modulated with an optional modulating method by the discrimination data is employed as the signal to be transmitted by the respective objects, the respective objects intermittently transmit the discrimination signal at the time interval inherent in each object and different from each other, the receiving station of each zone demodulates the modulated signal and takes out the discrimination data in order to discriminate the received signal, and the zone in which the object should exist is decided by comparing the electric power or amplitude of the received signal with the other signal per each signal between the receiving stations.

(7) And further, the system comprises a transmitting measure which is a location confirming system employing the intermittently-transmitting measure described in (5) and the suspected noise signal described in (3) and establishes the transmitting time intervals of the signal from the afore-mentioned respective objects to the time intervals inherent in each object and different from each other.

(8) And further, the system comprises a transmitting measure for transmitting the discrimination signal which is a location confirming system employing the receiving measure described in (5), and in which the time point of starting the transmission from the respective transmitters owned by the afore-mentioned respective objects is controlled such that the time point varies within a predetermined time period.

(9) And further, the system comprises a transmitting measure for transmitting the discrimination signal which is a location confirming system employing the receiving measure described in (5), and in which the time of transmission from the respective transmitters owned by the afore-mentioned respective objects is controlled such that the transmission time varies within a predetermined time period.

(10) In the location confirming system comprising a presuming measure for presuming an existing-area zone in which movable objects existing in a limited area carry a transmitter emitting a signal respectively having an inherent property, the respective signals emitted from the respective transmitters are monitored and received at plural message receiving stations arranged in accordance with an optional zone construction, and the zone in which the transmitter included in the respective objects exists is presumed by comparing the magnitude of the received signals' electric power with that of the other signal at the respective receiving stations, the system further comprises an existing-area zone presuming measure in which the transmission waves of different frequencies are allocated and successively transmitted as the signals transmitted by the respective objects, in the receiving stations of the respective zones, there is prepared a local oscillator for generating the standard signal of the number corresponding to the frequency allocated in order to frequency-convert the respective receiving signals to the signals of a constant intermediate frequency, the signals from the respective objects are separated by changing over the frequency thereof at an optional timing, and the zone in which the object should exist is decided by comparing the electric power or amplitude of the received signals with each other per each signal between the receiving stations.

(11) And further, the system described in (10) comprises an existing-area zone presuming measure in which the transmission wave of same frequency is employed, the signals which are diffusively modulated respectively with the suspected noise codes inherent in the respective objects are successively transmitted from the transmitters owned by the respective objects, each of the zone receiving stations has a set of reference signal generator, the reference signal emitted from the reference signal generator is changed over at an optional time interval, the correlative calculation is performed in order, and the zone in which the object should exist is decided by comparing the values calculated in such way per each suspected noise signal between the receiving stations.

EMBODIMENTS

The embodiments according to the present invention are described hereinafter, referring to the attached drawings.

FIG. 1 is a diagram showing a construction of the respective zones in a location confirming system according to the present invention.

In FIG. 1, the reference numeral 1 represents a backbone communication network, numerals 2a through 2c respective receiving stations, and numerals 3a through 3c respective zones.

The concerned area can be divided into plural zones 3a through 3c. In the example shown in FIG. 1, the concerned area is divided into three zones (A, B, C). Receivers 2a through 2c are respectively installed at the center position of the respective zones on the ceiling. Those receivers 2a through 2c are connected to each other through the backbone communication network. The signals received by the respective receivers are collected in a central station. It is allowed to employ a specially-used circuit for the present system or a LAN (Local Area Network) such as an "Ethernet" as the communication network.

An inherent signal is emitted from the respective transmitter and received by the receivers of the respective zones. It is preferable to transmit the signal in a direction toward the ceiling with a radiating characteristic near non-directional characteristic. The carrier of the radiated signal is allowed to be either one of electric wave, light wave or sound wave, if the signal transmission satisfies the afore-mentioned radiating characteristic. The "Ethernet" is one of the representative LANs of the Bus-type co-developed by the three U.S. companies; Xerox, Intel, and Digital Equipment (DEC), and employed as the inside-area information communicating network.

The Ethernet has a feature that the LAN thereof can be constructed with comparative simplicity and low cost. Such Bus-type LAN accomplishes the transmission speed of 10M-bits/sec., and co-axial cables are employed as the transmission medium.

There exists another type of LAN, that is, an "Optical Ethernet". Both the transmission speed and the interface thereof are same as those of the Ethernet, and the optical fiber is employed as the transmission medium. There exists still another type of LAN, that is, the one called a "Cheap-ernet (twisted pair wires)" as a popular name, the transmission speed of which is 1M bits/sec.

Until two or three years ago, the Ethernet had been popularized in such extent that the LAN signifies the Ethernet. Even at present, in case of connecting the engineering work station to each other, the LAN is constructed with only the Ethernet on many occassions.

However, the high-speed optical fiber LAN called FDDI which is co-proposed by the computer makers of the respective countries and the other LAN called "Token-Ring Type" proposed by U.S. IBM have emerged into the world, in the recent years.

Figure 2:
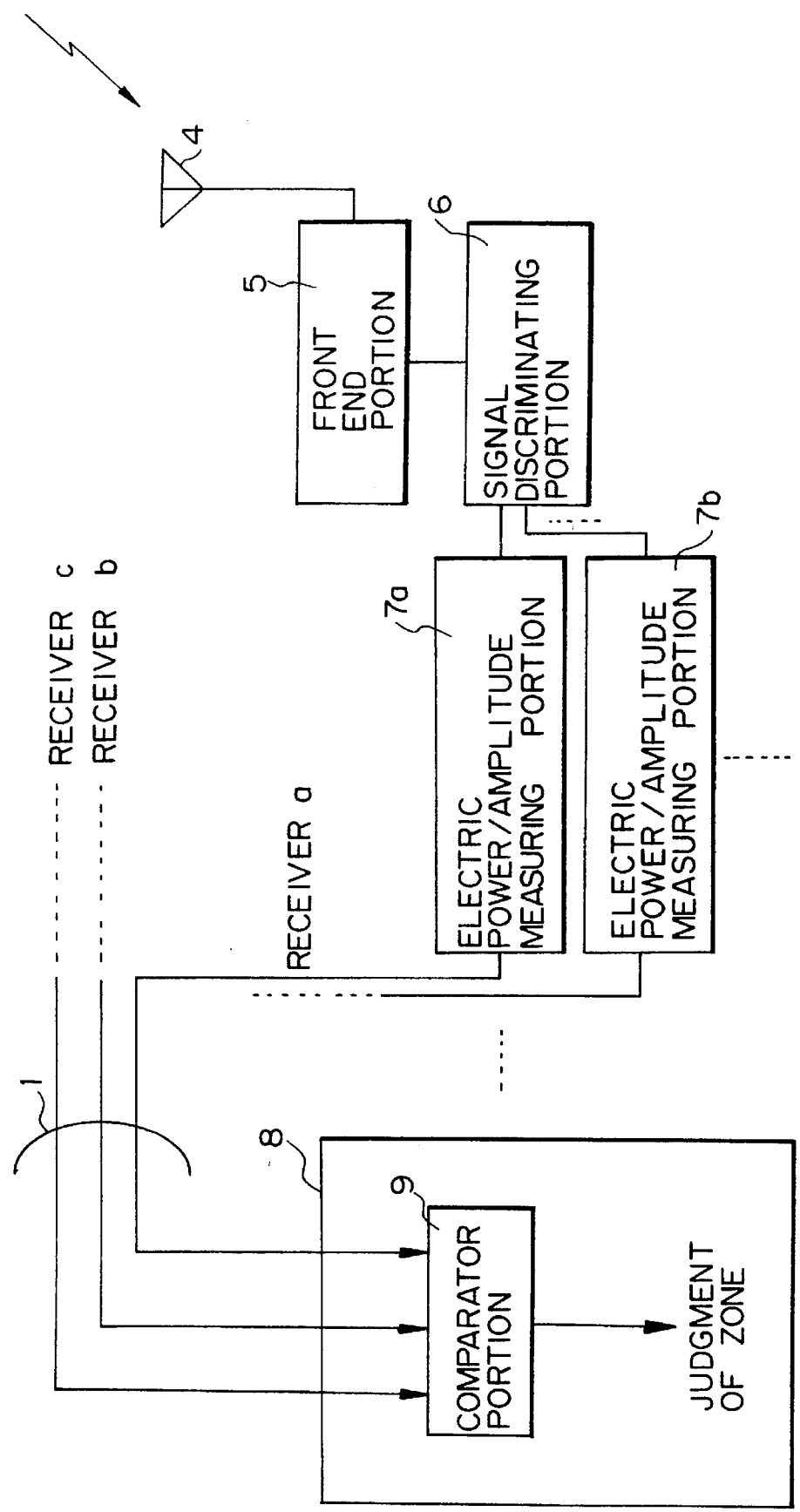
FIG. 2 is a block diagram showing a construction of the receiving station in a location confirming system according to the present invention.

FIG. 2 is a block diagram showing a construction of the receiving station in a location confirming system according to the present invention. In FIG. 2, the reference numeral 4 represents a receiving antenna, 5 a front end portion, 6 a signal discriminating portion, 7a and 7b electric power/amplitude measuring portions, 8 a central station, and 9 a comparator portion. As for the other portions, same reference numeral is attached to the portion performing same function as that shown in FIG. 1.

Hereinafter, the embodiment is described only in the case of utilizing the electric wave. In the respective receivers 2a through 2c, the front end portion 5 performs the operations of filtering and amplifying. Thereafter, the amplified signal emitted from the portion 5 passes through the signal discriminating portion 6 for discriminating the signal corresponding to the transmitting signal and the electric power or amplitude is measured at that time. The measured value is sent to the central station through the backbone communication network 1. Since the electric wave attenuates when the transmission distance becomes long, it is possible to know the zone, at the near place of which the worker having the transmitter is located by comparing the electric powers of the signals emitted from the respective transmitters a through c measured at the respective receiving stations, with each other.

The transmitters generating specified signals are respectively given to the workers. The receivers of the respective zones having a function of discriminating all of the signals can presume the zone where the worker stands. In such construction, the location can be confirmed.

Next, the second embodiment according to the present invention is explained. The second embodiment in connection with the first embodiment is a system for estimating the existing-area zone of the worker in which the discrimination of the signal emitted from the transmitter carried by the worker can be performed with the frequency of the carrier.

FIG. 3 is a block diagram showing a construction of the transmitter according to the present invention. In FIG. 3, the reference numerals 10a and 10b represent oscillators, 11a and 11b amplifiers, and 12a and 12b transmission antennas. The transmitter is constructed with the oscillators 10a and 10b generating the signals of the specified frequency inherent in the respective workers and the amplifiers 11a and 11b. In the embodiment shown in FIG. 3, the carrier of frequency f1 is transmitted from the transmitter transported by the worker 1 and the other carrier of frequency f2 is transmitted by the worker 2. If the amplitude of those signals is constant, whether or not the signal is modulated does not cause any problem. And further, it is preferable that the bandwidth of the signal is sufficiently narrow such that the carrier signals from the worker 1 and the worker 2 can be separated by the bandpass filter of the respective zone receiver.

Figure 4:
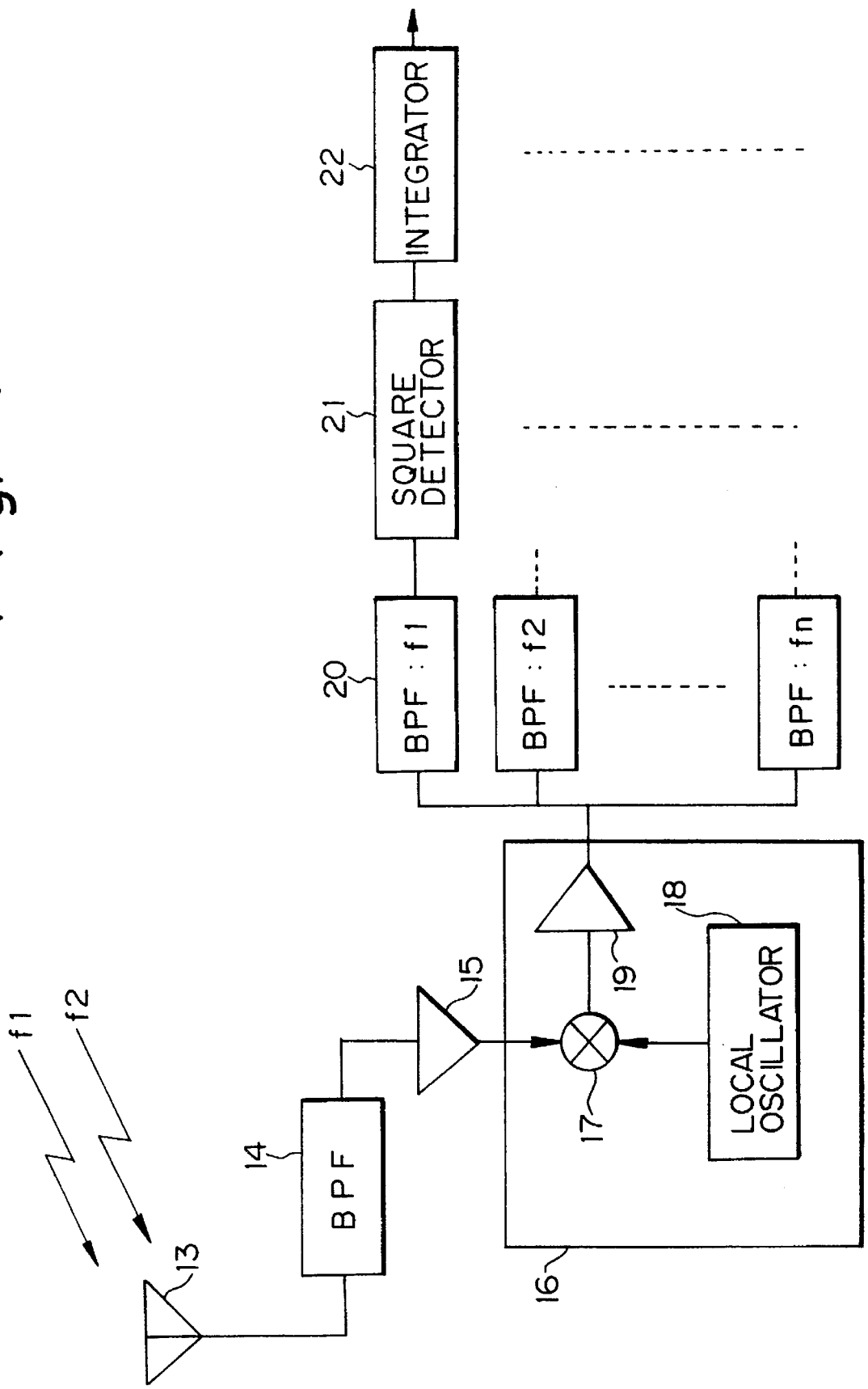
FIG. 4 is a block diagram showing a construction of the receiver according to the present invention.

FIG. 4 is a block diagram showing a construction of the receiver according to the present invention. In FIG. 4, the reference numeral 13 represents a receiving antenna, 14 a BPF (Bandpass Filter), 15 an amplifier, 16 a frequency converting portion, 17 a multiplier, 18 a local oscillator, 19 an amplifier, 20 BPFs (Bandpass Filters of frequencies f1, f2, - - - , fn), 21 square detectors, and 22 integrators.

The bandpass filter of the front end portion has a sufficiently wide bandwidth for causing all of the signal to be measured (frequency: f1–fn) to pass therethrough. The received signal is discriminated by the narrow-bandwidth bandpass filter 20 corresponding to only each frequency-modulated frequency. The respective signals are measured as the value of electric power through the square detector 21 and the integrator 22. In the embodiment the electric power is measured, while the value of amplitude is allowed to be measured by the envelop detector. Regarding the signals of the frequencies f1 through fn, the respective electric powers thereof are measured.

An adequate signal processing of the measured value necessary for the communication is executed, and thereafter, the processed signal is sent to the central station through the communication network. At the central station, as shown in the first embodiment, searching the measured value from the receivers of the respective zones enables the successive determination of the existing-area zone of the workers with real time.

In the system of the present invention, since modulation is not necessary for the transmitted signal, the construction of the transmitter is simplified, and at the same time, since the discrimination of the signal with the narrow bandpass filter becomes possible. Consequently, the construction of the receiver becomes simplified.

The above matters are thought to be the merits of the present invention.

Next, the third embodiment according to the present invention is explained. The third embodiment in connection with the first embodiment is the system in which the discrimination of the signal transmitted from the transmitter transported by each worker can be performed with a suspected noise code, and thereby the existing-area zone of the worker can be presumed.

FIG. 5 is a block diagram showing another construction of the transmitter according to the present invention. In FIG. 5, the reference numerals 30a and 30b represent PN signal (PN) generators, 31a and 31b amplifiers, 32a and 32b transmitting antennas, 33a and 33b multipliers, and 34a and 34b local oscillators. The transmitter is construct ed with the suspected noise signal (PN) generators 30a and 30b for generating the specific suspected noise signal respectively specified for the workers, the oscillators 34a and 34b for generating the signal of the carrier frequency.

In the embodiment shown in FIG. 5, the carrier signal modulated by the suspected noise signal PN1 is transmitted from the transmitter transported by the worker 1, while the other carrier signal modulated by the suspected noise signal PN2 is transmitted from the transmitter transported by the worker 2, respectively. Those carrier signals commonly occupy the same frequency bandwidth around the frequency fo. As for the suspected noise signal, for instance, an M-system code can be used. And further, there is no special restriction in the bandwidth of the suspected noise signal, and therefore the pulse length of the suspected noise signal can be decided optionally.

Figure 6:
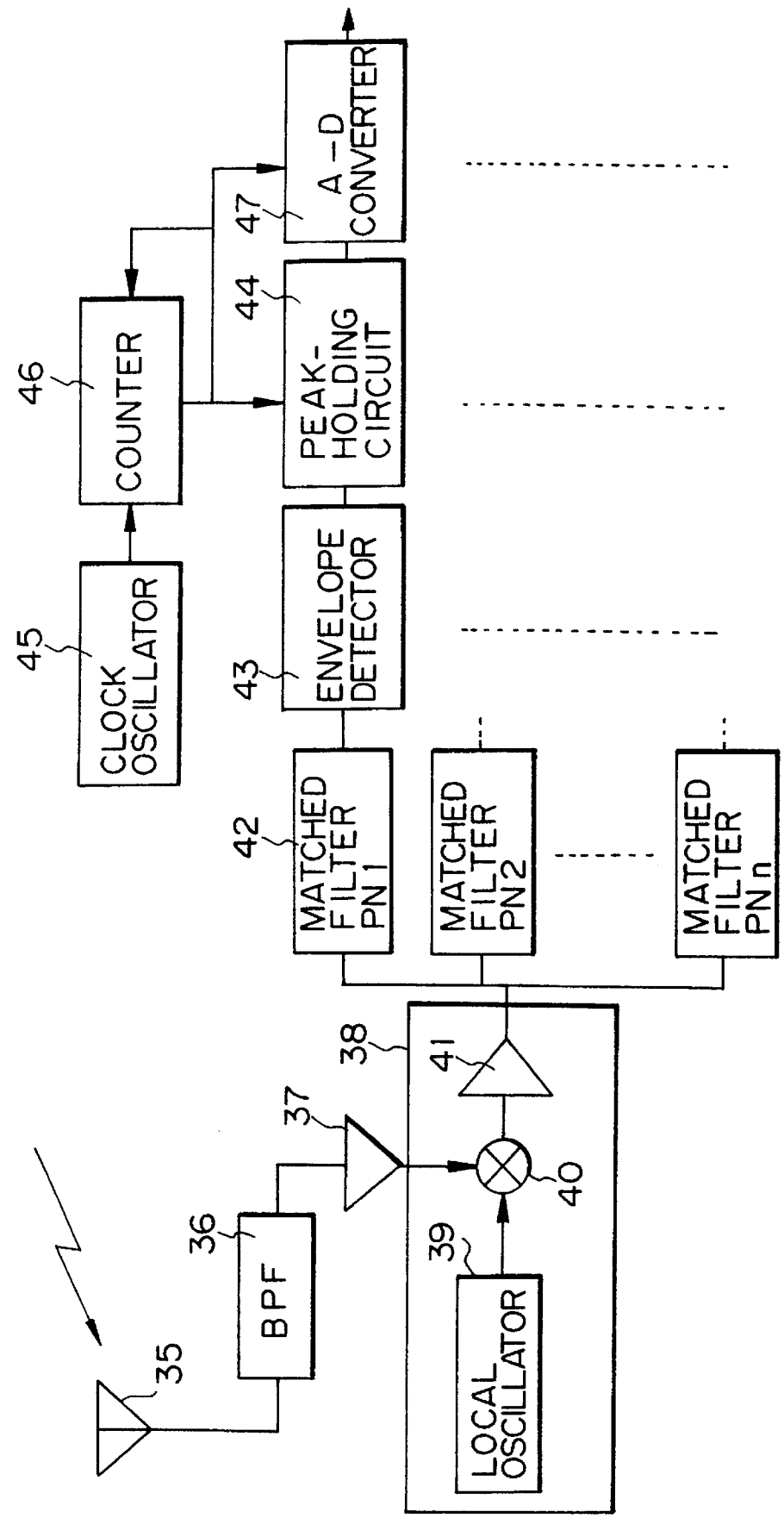
FIG. 6 is a block diagram showing another construction of the receiver according to the present invention.

FIG. 6 is a block diagram showing another construction of the receiver according to the present invention. In FIG. 6, the reference numeral 35 represents a receiving antenna, 36 a BPF, 39 a local oscillator, 40 a multiplier, 41 an amplifier, 42 matched filters, 44 peak-holding circuits, 45 a clock oscillator, 46 a counter, and 47 A-D converters, The bandpass filter of the front end portion has a bandwidth capable of causing the suspected noise signal to sufficiently pass therethrough. The received signal is frequency-converted. Thereafter, it is inputted into the matched filter 42 corresponding to the pattern of each suspected noise code pattern. The amplitude of the output signal emitted from the matched filter 42, may become maximum when PN1 is inputted, for instance, in the case of the PN1 matched filter.

Consequently, it is possible to know the electric power of the signal transmitted from the worker 1 contained in the receiving signal, by obtaining the amplitude of the output signal emitted from the matched filter by use of envelope detection, holding the peak value thereof during one period of the suspected noise signal, and measuring the amplitude value thereof after one time period. In the embodiment, the measurement of the amplitude is performed by use of the A-D converter 47, and the converted digital signal PN1 is sent to the central station through the communication network after executing the adequate signal processing needed for the communication as the signal electric power data of PN1. In the central station, as shown in the first embodiment, the existing-area of the respective workers can be determined per one time period of the PN code by researching the measurement values from the receiver of the respective zones.

Since the transmitted signal employs the same frequency bandwidth in the system of the present invention, the number of the transmitters can be simply increased only by exchanging the chip for deciding the code of the suspected noise signal generator (for instance, ROM, etc.) for another, and therefore the system can adequately correspond to the increase/decrease of the number of workers. These are merits of the present invention. And further, since the matched filter can be constructed with the digital correlative unit and the code can be changed by use of the software even in the receiver, the construction thereof can be simplified, as in the other embodiments of the invention.

Next, the fourth embodiment according to the present invention is explained.

The transmitter employed in the systems of the second and third embodiments is constructed so as to successively transmit the discrimination signal. To state in more detail, the confirmation of the worker's position is performed successively in the system of the second embodiment and it is performed per time period of the suspected noise signal. However, in practice, there occurs a case in which the worker does not move frequently between the zones according to the environmental state. On such occasion, it may only be required to intermittently perform the confirmation of the location.

The fourth embodiment assuming such environmental state is a transmitting system intermittently performing the transmission of the discriminating signal.

Figure 7:
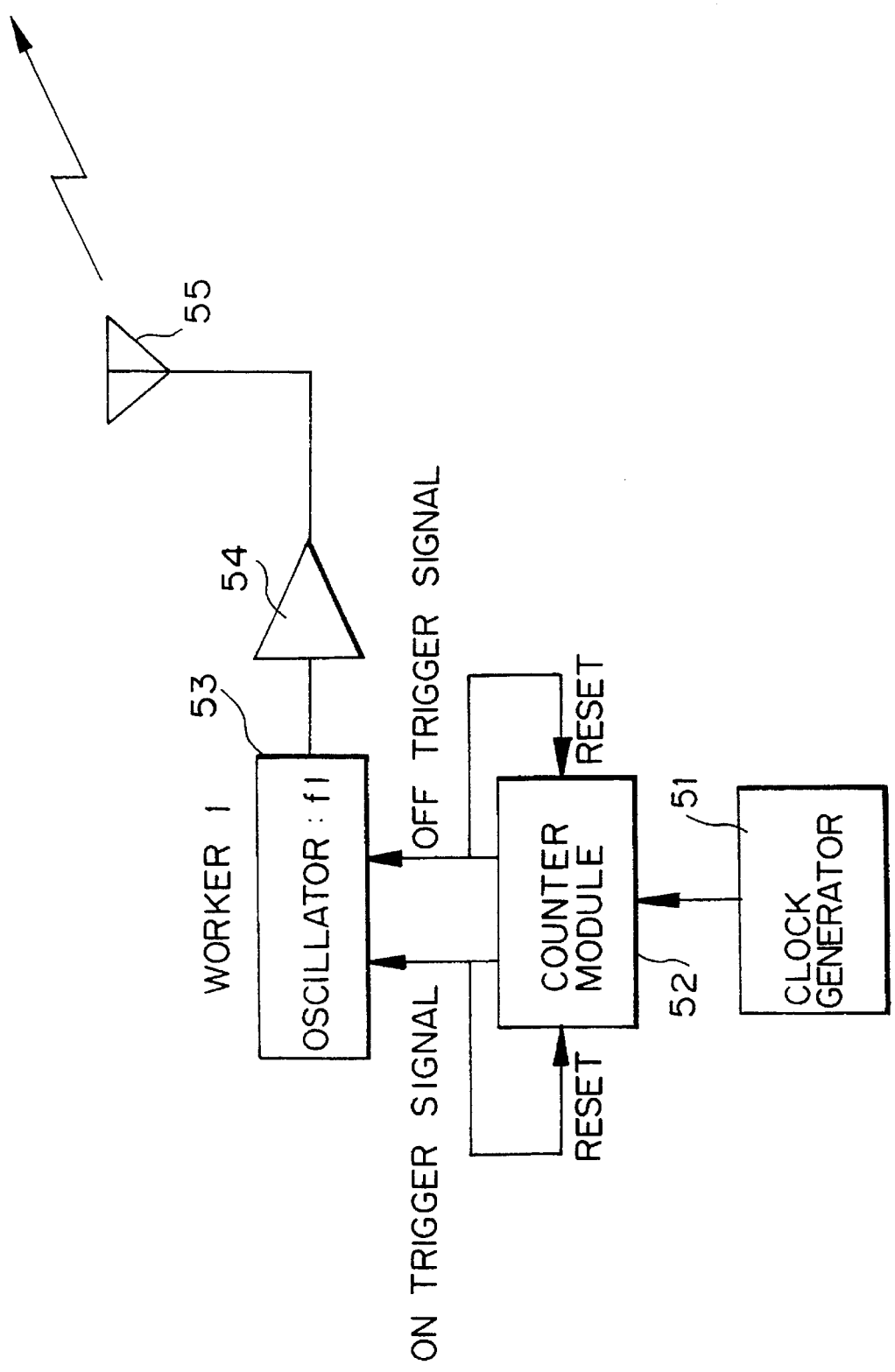
FIG. 7 is a block diagram showing still another construction of the transmitter according to the present invention.

FIG. 7 is a block diagram showing still another construction of the transmitter according to the present invention. In FIG. 7, the reference numeral 51 represents a clock transmitter (generator), 52 a counter module, 53 an oscillator, 54 an amplifier, and 55 a transmitting antenna.

Figure 8:
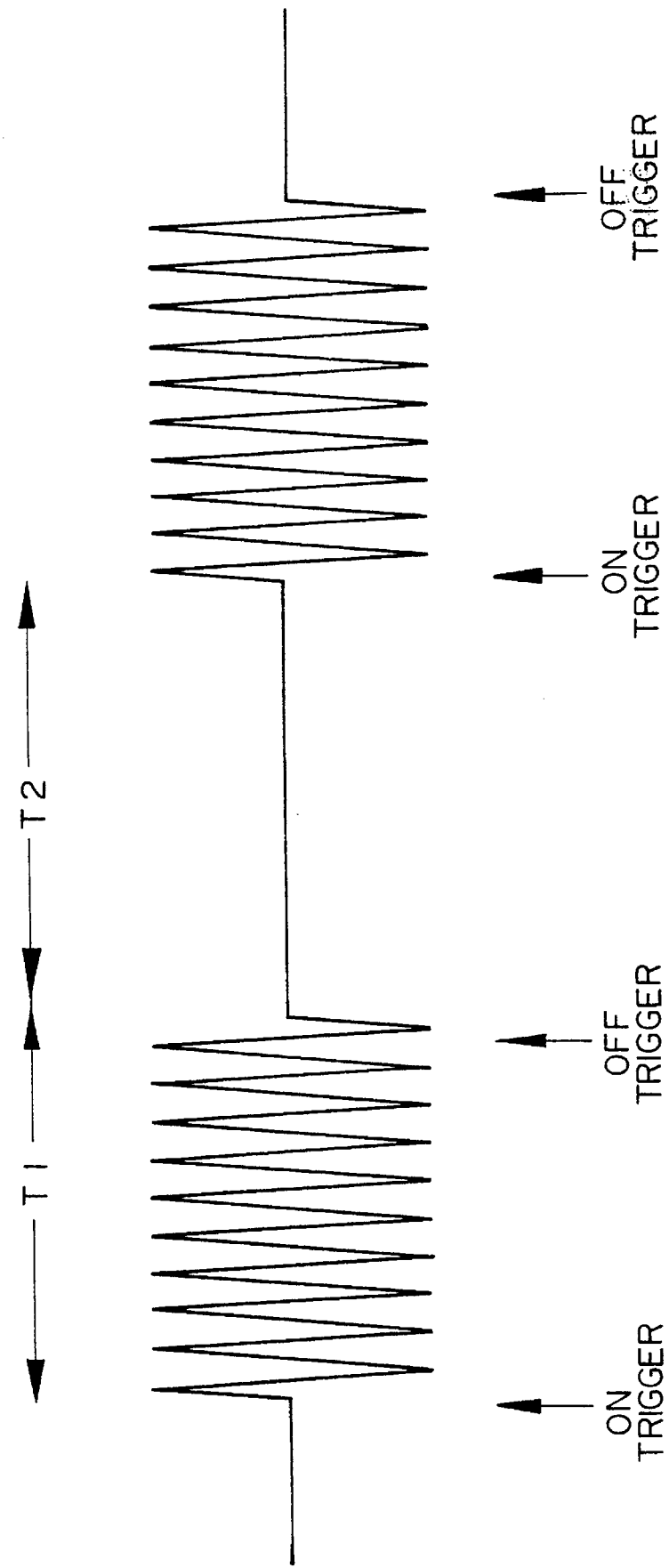
FIG. 8 is a diagram showing the waveform of the message transmitting signal in FIG. 7.

FIG. 7 shows a construction of the transmitter employed in the second embodiment. The transmission of the discrimination signal is controlled by the ON trigger signal and OFF trigger signal from the counter module 52. The transmitted signal is shown in FIG. 8 The counter module 52 counts the number of pulses of the clock signal supplied from the clock generator 51 and thereby measures the time intervals T1 and T2. The counter module 52 is constructed with one or more counters and therefore it can count two or more types of pulses. If the transmission has been already performed at the time of starting the supply of the electric power of the transmitter, firstly the counter module 52 measures T1 at the time point. After measuring T1, the module 52 generates the OFF trigger signal, and the OFF trigger signal turns off the oscillator, and thereby the output of the oscillator becomes zero. The signal further resets the counting function of the counter module 52 and functions as the trigger starting the measurement T2 at the same time. After measuring the time interval T2, the counter module generates the ON trigger signal and the ON trigger signal turns on the oscillator, and thereby the output of the oscillator is emitted therefrom. The signal further resets the counting function of the counter module 52 and functions as the trigger starting the measurement T1 at the same time.

Such operation as mentioned above is repeated and thereby the discrimination signal as shown in FIG. 8 is transmitted intermittently. The time interval T1 is selected to be sufficient for measuring the electric power or amplitude at the zone receiver. The setting of the time interval T2 is optional, in principle. However, taking into consideration that the location confirming system is featured to have a function to determine the existing-area zone transported by the worker, it is necessary to establish the length thereof to an extent such that the worker does not overlook. It means that the length depends upon the size of the zone. For instance, in the case of setting the distance between the zone receivers to 1 [m], when the moving speed of the worker is v [m/s], it may be allowed that T2 is set to a value not more than the time interval under the condition of not passing through the adjacent zone at the time of worker's movement, as shown in the below inequality:

$T2 < ½/v$ [sec].

Figure 9:
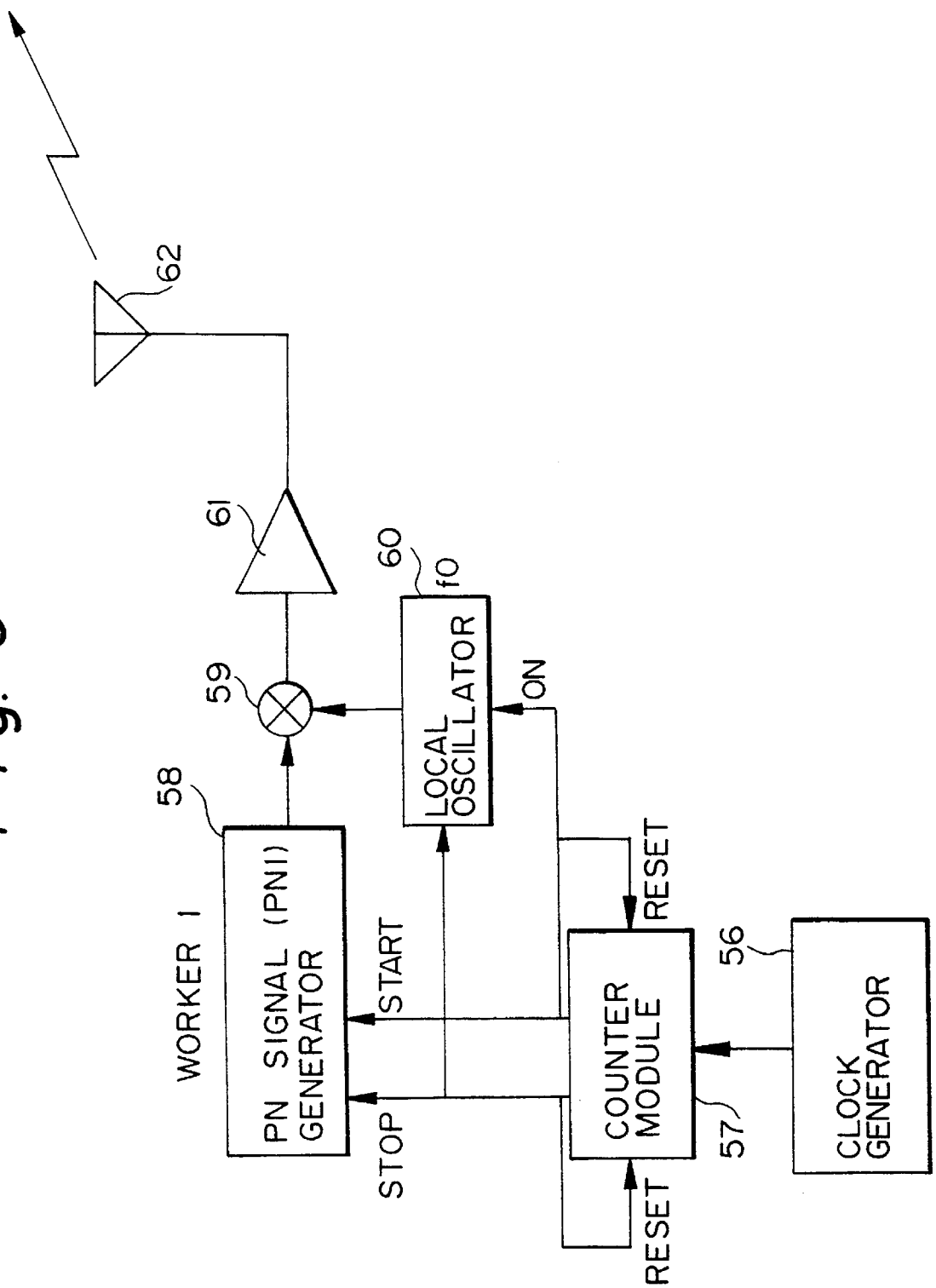
FIG. 9 is a block diagram showing still another construction of the transmitter according to the present invention.

FIG. 9 is a block diagram showing still another construction of the transmitter in the third embodiment according to the present invention. In FIG. 9, the reference numeral 56 represents a clock generator, 57 a counter module, 58 a PN signal (PN1) generator, 59 a multiplier, 60 a local oscillator, 61 an amplifier, and 62 a transmitting antenna.

The transmission of the discrimination signal is controlled by the ON and OFF trigger signals emitted from the counter module 57 as in the case of FIG. 7.

The counter module 57 counts the number of pulses of the clock signal supplied by the clock generator 58 and measures the time intervals T1 and T2. At the time of supplying the electric power to the transmitter, the ON trigger signal is sent out from the counter module 57 and turns on the local oscillator 60. The signal starts the PN signal generator 58 at the same time. The counter module 57 counts the clock generator 56 since the electric power supply is turned on and measures the time interval T1 of the discrimination signal transmission. The counter module 57 generates the OFF trigger signal after measuring the time interval T1 and the trigger signal turns off the oscillator and its output disappears.

Figure 10:
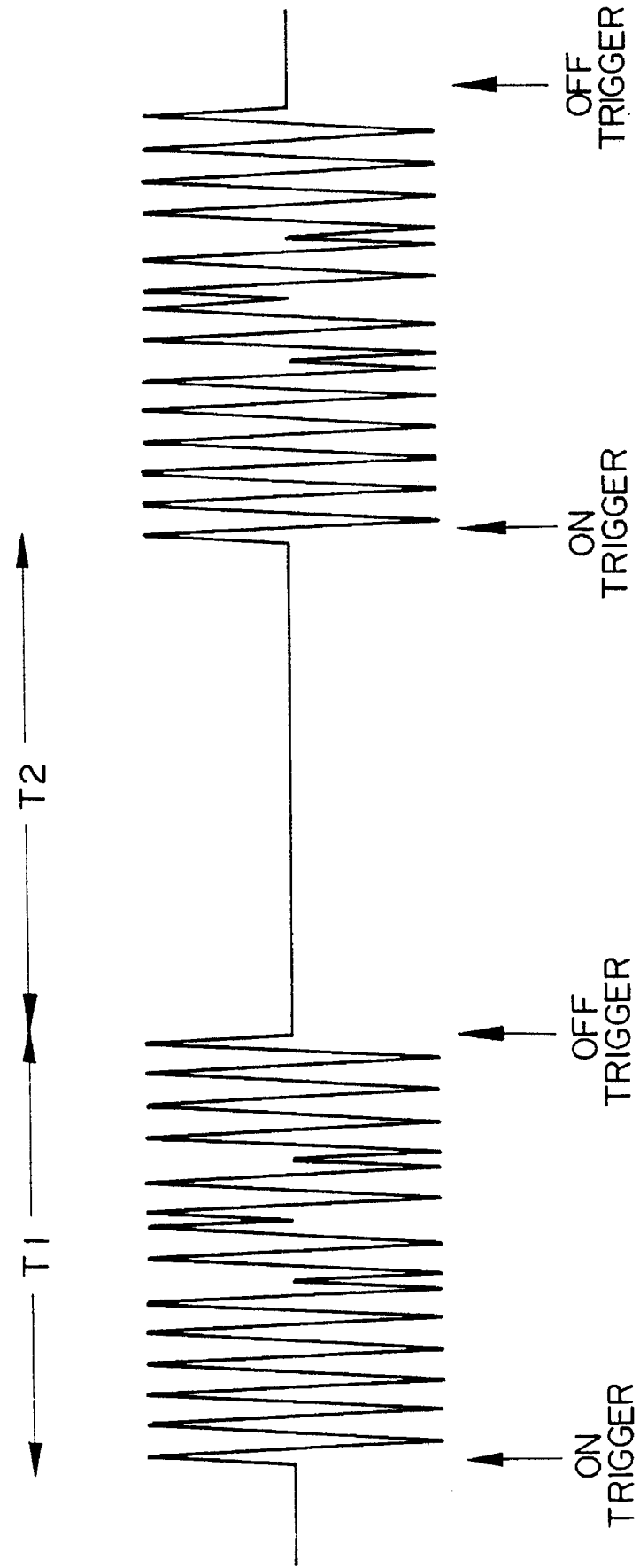
FIG. 10 is a diagram showing the waveform of the message transmitting signal in FIG. 9.

In the embodiment, the trigger signal further turns off the PN signal generator. It is not always necessary. The signal further resets the counter function of the counter module 57, and it functions as the trigger for starting the measurement of the time interval T2 at the same time. After measuring the time interval T2, the counter module 57 generates the ON trigger signal and the signal turns on the oscillator. In the embodiment, the trigger signal further turns on the PN signal generator 58. The signal further resets the counter function of the counter module 57 and functions as the trigger for starting the measurement of the time interval T1 at the same time. Such operation is repeated and thereby the discrimination signal as shown in FIG. 10 is transmitted intermittently.

The setting of the time interval T1 is different from the case of the transmitter shown in FIG. 7. Since the discrimination signal to be transmitted is the PN signal, it is necessary to transmit it during the time period of one or more periods. Therefore, T1 is set so as to satisfy the following inequality:

T1>PN Signal Period.

The setting of the time interval T2 is same as the case of FIG. 7.

As mentioned heretofore, according to the present invention, since the transmitter can transmit the discrimination signal intermittently, the consumed electric power ot the transmitter transported by the worker can be saved, and therefore the capacitance of the driving battery turns out to be small. These are merits of the present invention.

Next, the fifth embodiment according to the present invention is explained.

In the case of receiving the discrimination signal from the transmitter employing the intermittently-transmitting system described in the fourth embodiment, since the receiving system shown in the second and third embodiments operates on the premise that the discrimination signal is transmitted continuously, the received electric power turns out to be measured even during the time period of not transmitting the signal. On this occasion, it follows that the electric power of the multi-pass or the electric power of the noise are measured, and thereby the existing-area zone of the worker becomes indefinite during the time period of not transmitting the signal.

In order to solve such problem, the fifth embodiment adopts the transmitting method of measuring only the electric power of the received signal during the time period of the transmission.

Figure 11:
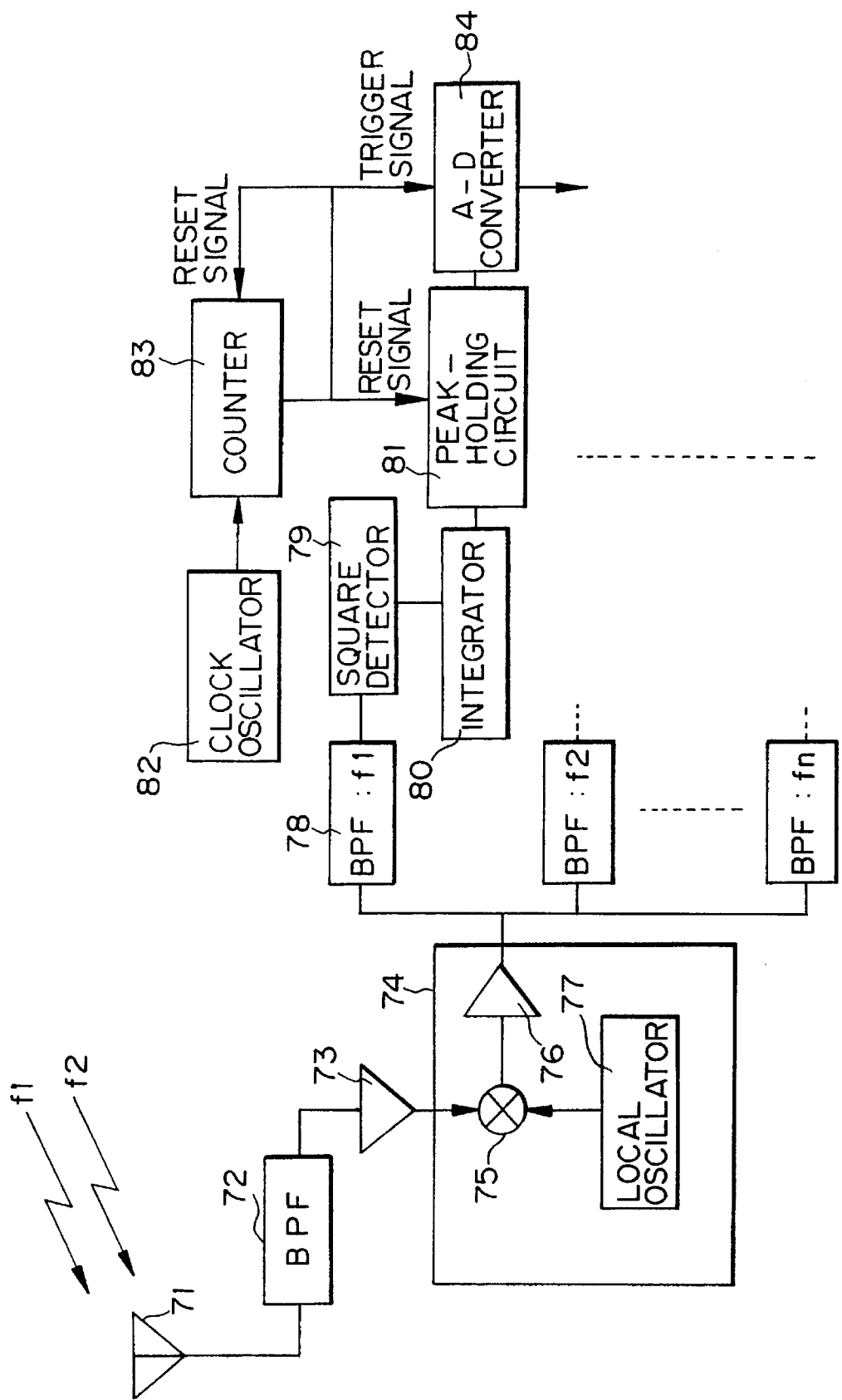
FIG. 11 is a block diagram showing still another construction of the receiver according to the present invention.
Figure 12:
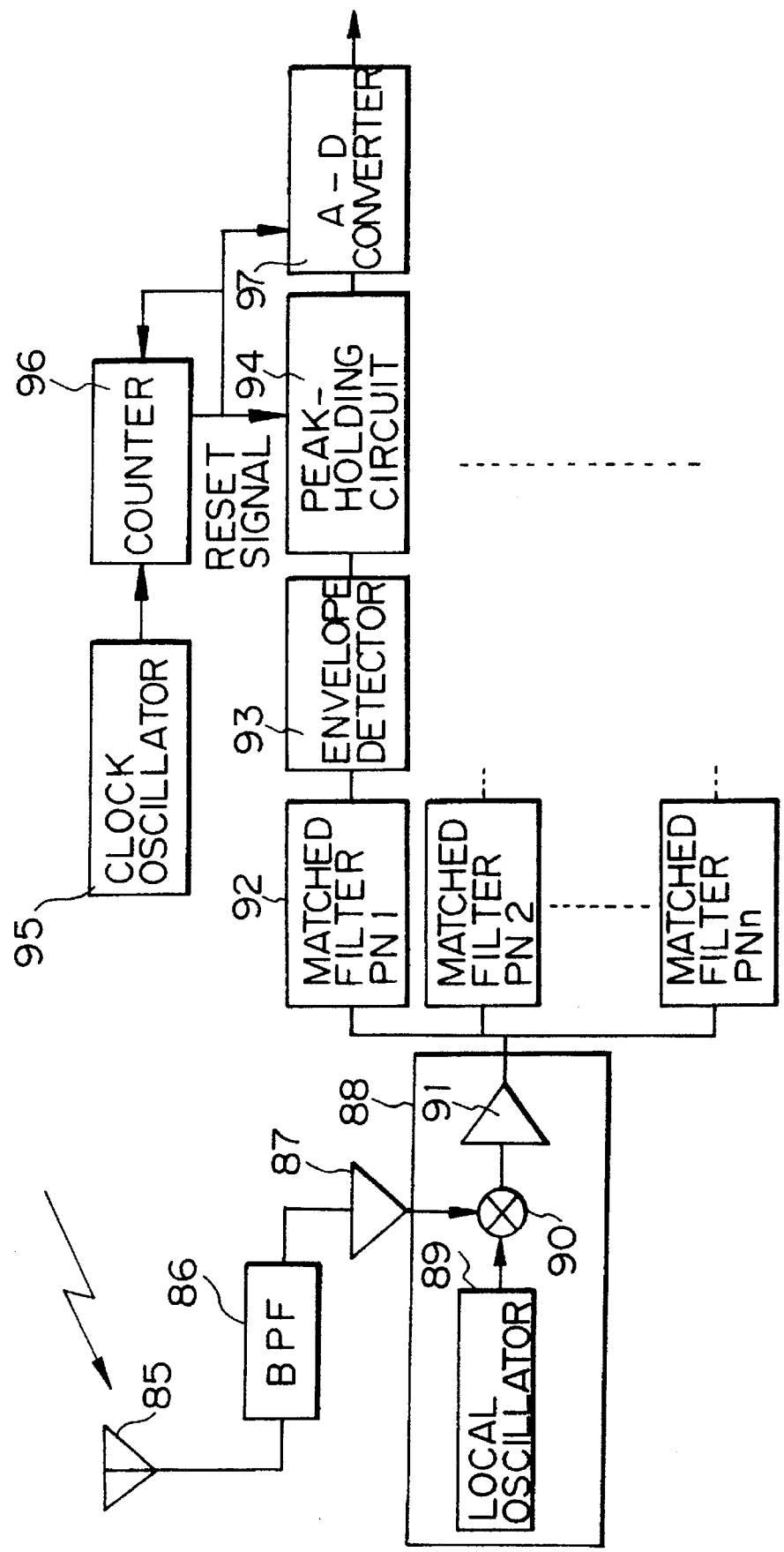
FIG. 12 is a block diagram showing still another construction of the receiver according to the present invention.

FIGS. 11 and 12 are block diagrams showing still other constructions of the receiver according to the present invention.

In FIGS. 11 and 12, the reference numeral 71 represents a receiving antenna, 72 a BPF, 73 an amplifier, 74 a frequency converter, 75 a multiplier, 76 an amplifier, 77 a local oscillator, 78 BPFs, 79 square detectors, 80 integrators, peak-holding circuits, 82 a clock oscillator, 83 a counter, 84 A-D converters, 85 a receiving antenna, 86 a BPF, 87 an amplifier, 88 a frequency converter, 89 a local oscillator, 90 a multiplier, 91 an amplifier, 92 matched filters, 93 envelope detectors, 94 peak-holding circuits, 95 a clock oscillator, 96 a counter, and 97 A-D converters.

In such circuit construction, the measurement values are converted to data through the A-D converters 82 and 97. The counters 83 and 96 respectively count the pulses from the clock generators 82 and 95 and thereby measure the transmitting time interval T1+T2 of the discrimination signal. During this time interval, the data are not transmitted to the central station. At the time of finishing the measurement of the time interval T1+T2, the data are sent out from the A-D converters 84 and 97 by the trigger signal outputted from the counter, and sent to the central station through the communication network with an adequate treatment. The trigger signal from the counter releases the peak-holding and resets the counter, and then the measurement regarding the next transmitting signal starts.

In such way, the counter for measuring the sum of the transmitting time period of the discrimination signal and the stopping time period thereof is established in order to control the transmission of the measured data. In such way, the problem that the existing-area zone becomes indefinite during the time period of stopping the transmission can be solved.

Figure 13:
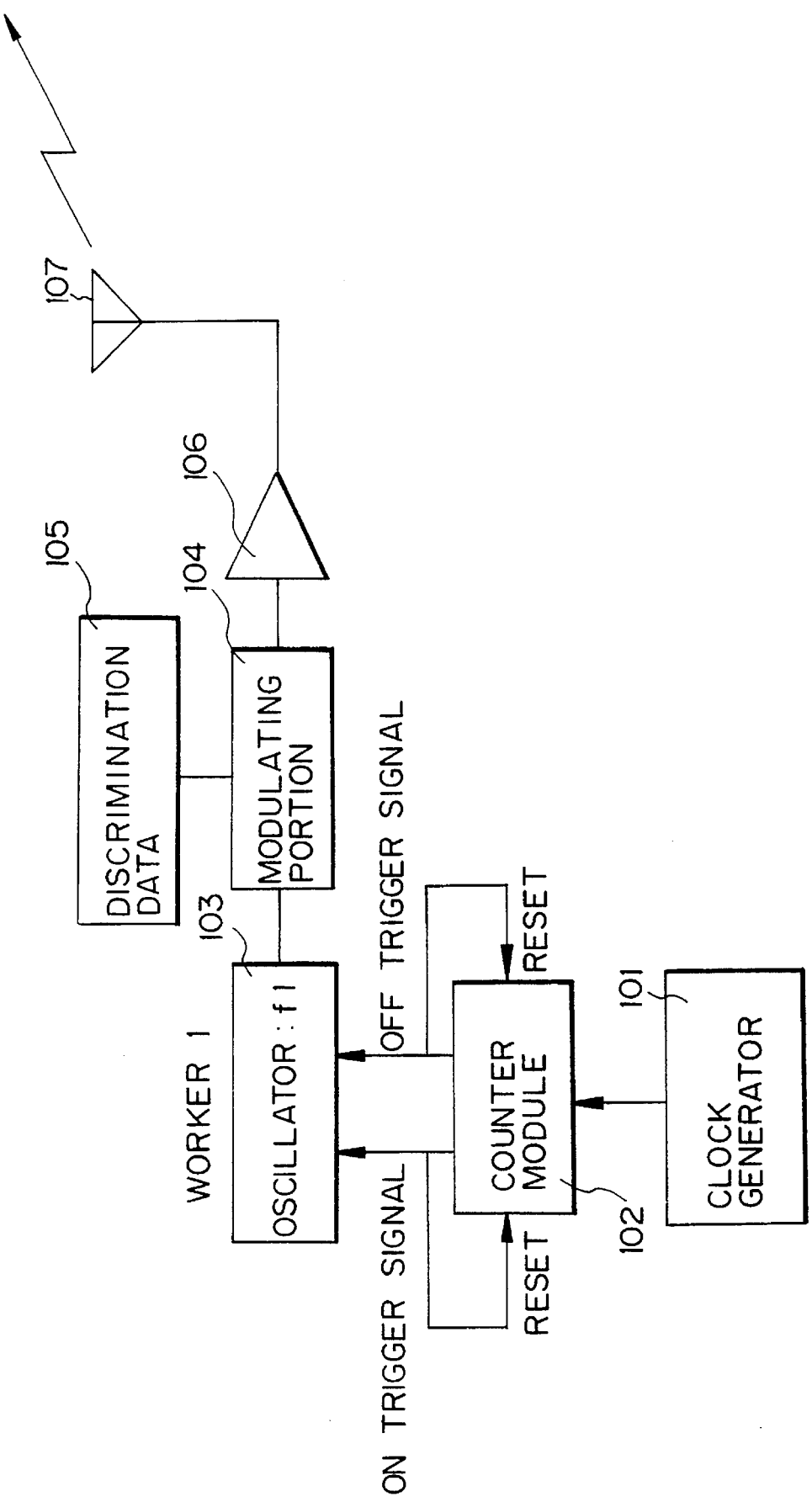
FIG. 13 is a block diagram showing still another construction of the transmitter according to the present invention.

Next, the sixth embodiment according to the present invention is explained. In the existing-area zone determining system employed in the second through fifth embodiments, it was necessary to prepare a filter or a matched filter for discriminating the discrimination signal of all workers transporting the receiver. The sixth embodiment is a system that can realize the receiver with simpler construction. FIG. 13 is a block diagram showing still another construction of the receiver according to the present invention.

In FIG. 13, the reference numeral 101 represents a clock generator, 102 a counter module, 103 an oscillator, 104 a modulating portion, 105 a discrimination data, 106 an amplifier, and 107 a transmitting antenna.

Figure 14:
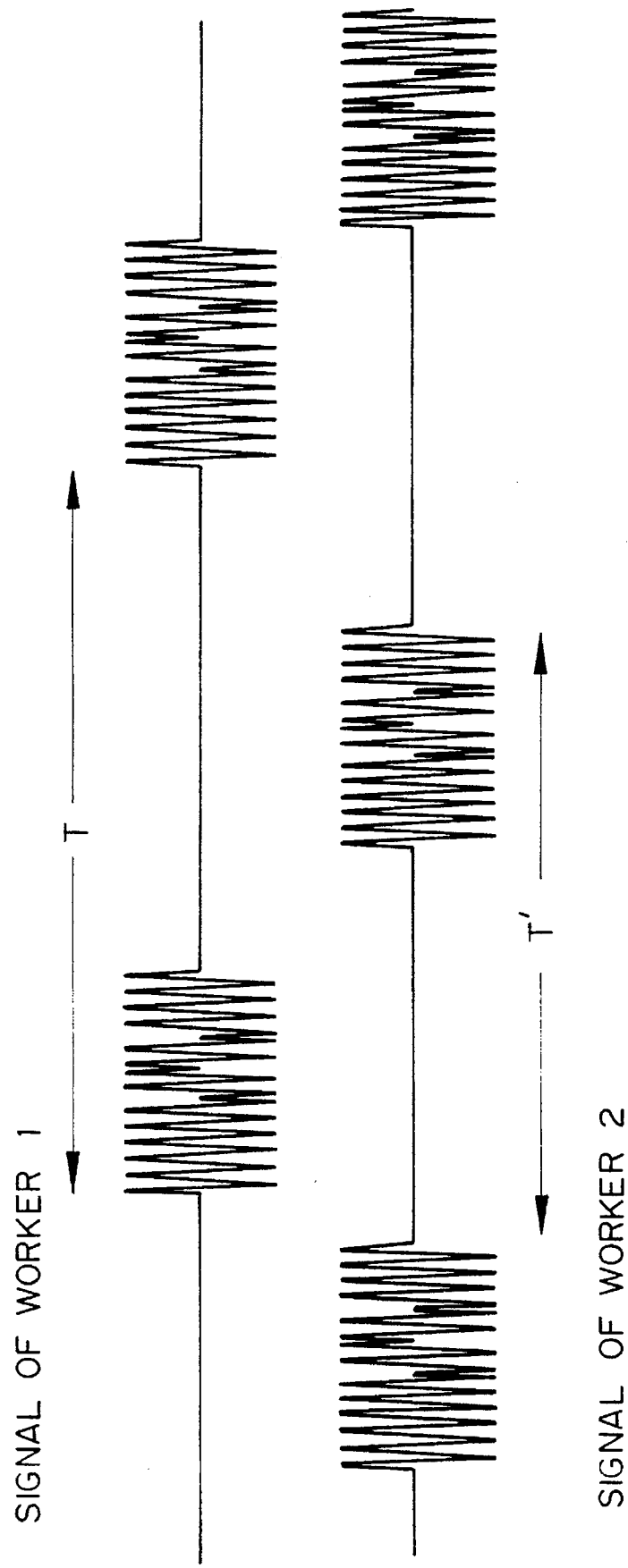
FIG. 14 is a diagram showing waveforms of the discrimination signals in FIG. 13.

The signal from the transmitter is transmitted intermittently as in the case of the fourth embodiment. However, the frequency of the carrier is same (constant), and the constant-amplitude modulation of PSK and FSK, etc., is performed by use of the discrimination data. The transmitter of the respective workers operates with the inherent transmitting time period and stopping time period, and the sum of the transmitting period and the stopping period is established so as to differ from each other per transmitter of the respective workers. Since the timing of transmitting and stopping relatively shifts in such establishment, when the number of the workers is small, there exists a time period (T=T'), when only a certain discrimination signal is emitted as shown in FIG. 14.

Figure 15:
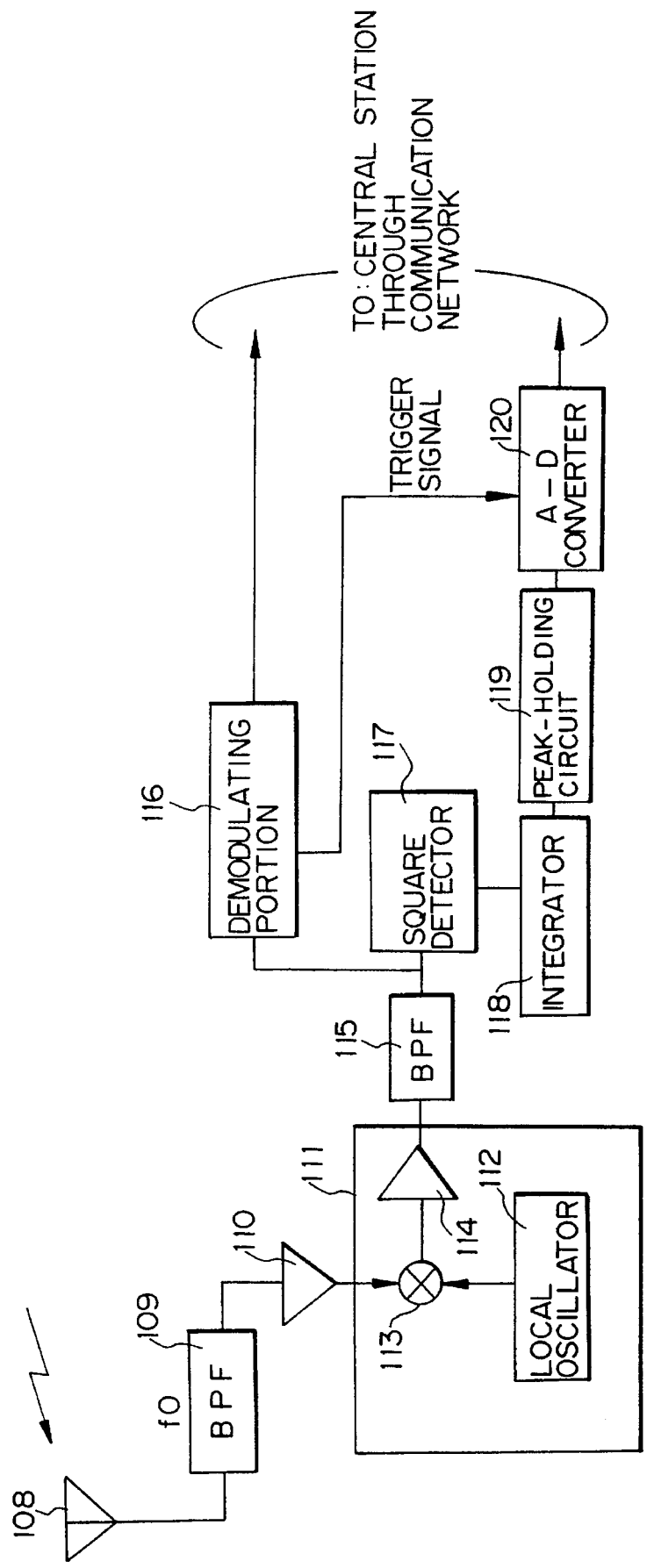
FIG. 15 is a block diagram showing still another construction of the receiver according to the present invention.

FIG. 15 is a block diagram showing still another construction of the receiver according to the present invention. In FIG. 15, the reference numeral 108 represents a receiving antenna, 109 a BPF, 110 an amplifier, 111 a frequency converter portion, 112 a local oscillator, 113 a multiplier, 114 an amplifier, 115 a BPF, 116 a demodulating portion, 117 a square detector, 118 an integrator, 119 a peak-holding circuit, and 120 an A-D converter.

The received signal is frequency-converted, and the converted signal is inputted to the demodulating portion 116 and the circuit for measuring the received electric power. The received signal has been already modulated by the data packet of special format including the discrimination data of the signal and the control data regarding the measurement of the electric power. Those modulated data are demodulated in the demodulating portion 116. The circuit for measuring the electric power is constructed with the square detector 117 and the integrator 118 as in the former cases. In such construction, the peak value thereof is peak-held and adopted as the measuring value, and the same is converted to the data in the A-D converter 120. A trigger signal showing the termination of demodulating the data packet as well as the discrimination data is sent out from the demodulating portion 116. The discrimination data and the power measuring data are treated suitably and thereafter transmitted to the central station through the communication network. In the central station, the power measuring data are compared referring to the discrimination data, and the existing-area zone is determined.

In such manner according to the present invention, since only one sort of filter and one sort of power measuring circuit are required for the receiver, it may be possible to realize the system with a simple construction.

Next, the seventh embodiment according to the present invention is explained. The system employing the intermittently-transmitting system described in the fifth embodiment employs same frequency bandwidth and performs discrimination of the signal by use of the suspected noise signal. However one of the problems in the case of employing the suspected noise signal is that, when the number of the workers increases, the output of the matched filter becomes large due to the mutual correlation and the discrimination of the subject signal may turn out to be difficult.

In the system of the seventh embodiment the transmitter of the respective workers is established such that it operates with inherent transmitting/stopping time intervals and the sum of those intervals differs from each other per each transmitter of the respective workers. In such manner, since the timing of transmitting and that of stopping shift mutually, it follows that, when the number of the workers is small, there exists a time of transmitting only the discrimination signal. The construction of the transmitter employed in the present system can be realized by the embodiment shown in FIG. 9. However, it is necessary to set the sum of the transmitting time interval and the stopping time interval (T1+T2) so as to differ from each other per each transmitter.

Figure 16:
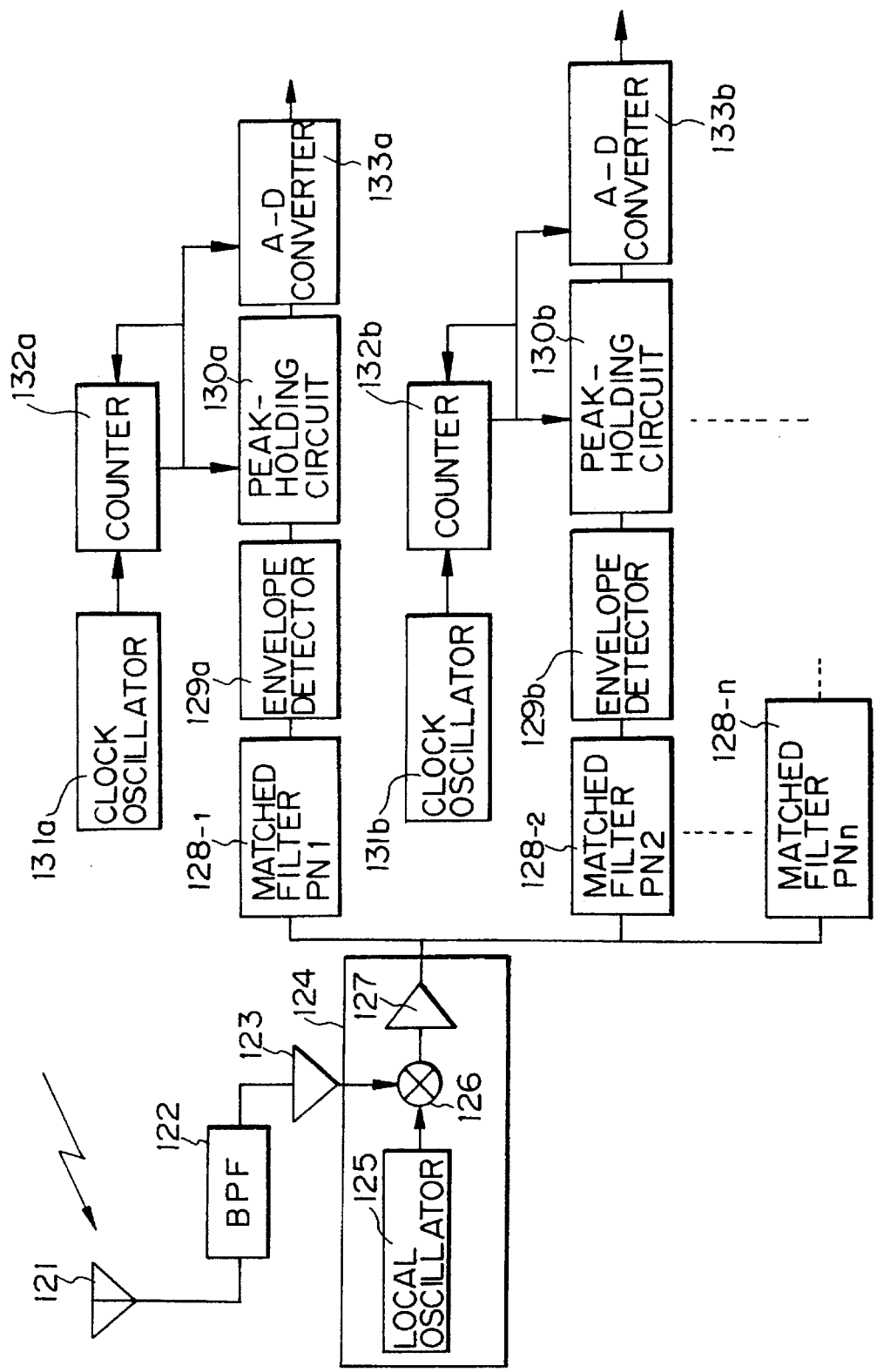
FIG. 16 is a block diagram showing still another construction of the receiver according to the present invention.

FIG. 16 is a block diagram showing still another construction of the receiver according to the present invention. In FIG. 16, the reference numeral 121 represents a receiving antenna, 122 a BPF, 123 an amplifier, 124 a frequency converting portion, 125 local oscillator, 126 a multiplier, 127 an amplifier, 128-1 to 128-n matched filters, 129a and 129b envelope detectors, 130a and 130b peak-holding circuits, 131a and 131b clock oscillators, 132a and 132b counters, and 133a and 133b A-D converters.

The measurement of electric power regarding the respective discrimination signals is performed after the time inherent in the respective signals, and the setting of the time is done differently for the respective signals. In the embodiment shown in FIG. 16, the measurement is done per each time interval (T1+T2) for the signal of the worker 1, and per another each time interval (T1'+T2') for the signal of the worker 2.

In such manner, since the transmission of the signals from the respective transmitters shifts in time, it follows that the influence of the noise caused due to the mutual correlation between the respective signals can be reduced, and thereby it becomes possible to determine the existing-area zone more precisely.

Next, the eighth embodiment of the present invention is explained. In the sixth and seventh embodiments, the signals from the respective objects can be established such that the different time intervals thereof inherent in each object do not overlap with each other. However, since the transmitting time interval and the stopping time interval are different relatively, but those are constant (fixed) per each object, the probability of overlapping with the signal from the other station is largely due to the contingency, and there exist a possibility that the object easily overlap or another possibility that the object hardly overlapping can be decided with necessity. And further, the measured time periods are different from each other per respective objects and the frequencies of obtaining the respective location confirming data from each other per respective objects. Those are the problems to be solved.

In the transmitter of the eighth embodiment, in order to perform the control of the transmitting time period so as to realize, as fairly as possible, the condition on which the transmission from the respective objects does not occur at the same time, the transmitting method of changing the time point of the state of transmission within the predetermined constant time period. An example of the transmitting signal according to the present invention is shown in FIG. 17a. The time period T is equal to T1+T2 shown in FIG. 11 and FIG. 12, and it is a constant value representing a measurement value. T1 represents the time period of transmitting the signal. FIG. 17b shows another example in which a pattern of the transmitting signal is sent out four times in total per each time period T. The time point of sending out the respective signals differs from each other per each sending-out time.

FIG. 18 is a block diagram showing still another construction of the transmitter according to the present invention. The block diagram shows the construction of the transmitter applied to the invention in the case of transmitting the suspected noise signal in the system as mentioned in the fifth embodiment. In FIG. 18, the reference numeral 141 represents a clock generator, 142 a counter module, 143 a ROM (Read Only Memory), 144 a PN signal (PN1) generator, 145 a local oscillator, 146 a multiplier, 147 an amplifier, and 148 a transmitting antenna.

In order to obtain the sending-out pattern as shown in FIG. 17a for instance, the control signal as shown in FIG. 17b is employed to turn on or turn off the PN signal generator 144 and the local oscillator 145. In the present embodiment, the sending-out pattern shown in FIG. 17b is written into the ROM 143 and the ON/OFF signal is read out therefrom. Namely, the clock generator 141 generates pulses, and the counter module 142 counts those pulses and thereby measures the time, and at the same time converts those measured values in parallel to the address signals. The signals shown in FIG. 17a are outputted from the ROM 143 by the address signal. Assuming that the sending-out pattern signals are written into the addresses from "00" to "FF" of the ROM 143, the counter module 142 is designed such that the address signal "100" of the counter module 142 resets the counter, and in such construction the sending-out pattern is repeated per each time period 4T.

In the present invention, the transmission of the discrimination signal is performed randomly, and the interference of the signals from the respective objects occurs rarely. These are merits of the invention. And further, in the present invention, since the value of T is constant, the system of the fifth embodiment of the present invention as it is can be applied to the receiving of the signal from the transmitter of the invention.

Next, the ninth embodiment of the present invention is explained. In the eighth embodiment, the time point of starting the transmission is changed. However, it is possible also to change the time period during the same measuring time period T. The transmitter of the ninth embodiment fixes the measuring time period T, and employs the system for fairly performing the receiving/transmitting the signal from the respective objects by changing the transmission time period per each time.

Figures 19A, 19B:
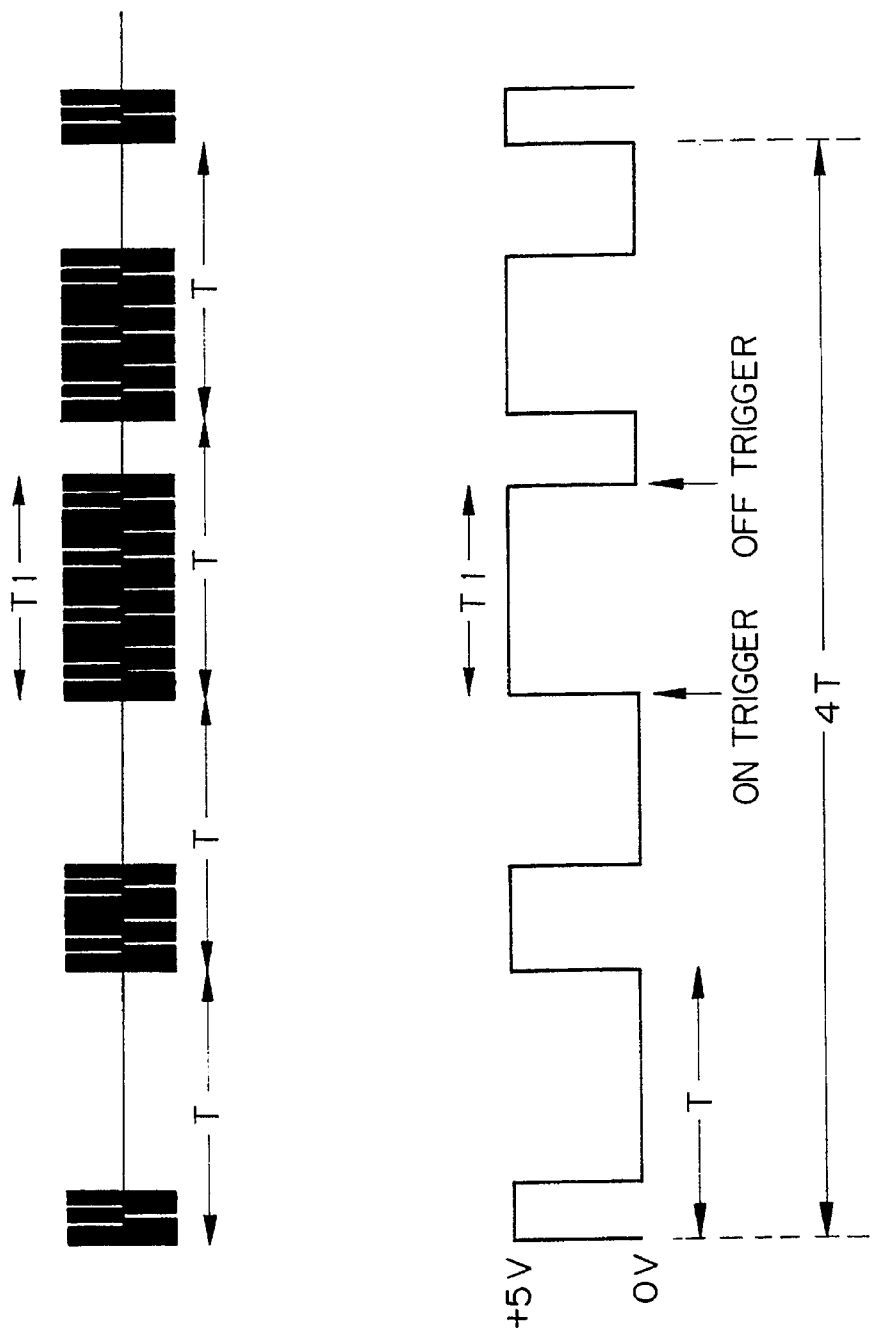
FIGS. 19a–19b are diagrams showing the waveform of the transmitting signal according to the present invention.

FIG. 19 shows a diagram showing waveforms of the transmitting signal according to the present invention. In FIG. 19a, the time period is a constant value representing the measuring period just as FIGS. 17a and 17b. FIG. 19b shows an example in which a pattern of the transmitting signal is formed during the time period 4T. Although the signal is sent out four times per each time period 4T, the transmitting time period T1 differs from each other per each time.

FIG. 20 is a block diagram showing still another construction of the transmitter according to the present invention. FIG. 20 shows the construction of the transmitter applied to the present invention in the case of transmitting the suspected noise signal in the system of the fifth embodiment. In FIG. 20, the reference numeral 151 represents a clock generators, 152 a counter module, 153 a ROM, 154 a local oscillator, 155 a PN signal (PN1) generator, 156 a multiplier, 157 an amplifier, and 158 a transmitting antenna.

In order to obtain the sending-out pattern as shown in FIG. 19a for instance, the control signal shown in FIG. 19b can be used for turning on and turning off the PN signal generator 155 and the local oscillator 154. In the embodiment, the sending-out pattern shown in FIG. 19b is written in the ROM 153, and the ROM 153 outputs the ON/OFF signal by reading out the pattern. Namely, the clock generator 151 generates pulses, and the counter module 152 counts the pulses in order to measure the time, and converts in parallel the counted pulses to the address signal at the same time. The signal as shown in FIG. 19a is outputted from the ROM 153 by the address signal. Assuming that the sending-out pattern signals are written in the area of the ROM 153; the addresses from "00" to "FF", the counter module 152 is designed such that the counter is reset by the address signal "100" of the counter module 152. In such construction, the sending-out pattern is repeated per each time period 4T.

In the present invention, since the overlapping time of transmitting the discrimination signal differs from each other per each measuring time, the functional effect similar to that of the eighth embodiment can be obtained. And further, since the time period T is constant, the fact that the system shown in the fifth embodiment as it is can be employed for receiving the signal from the transmitter of the invention is same as the system of the eighth embodiment.

All of the foregoing embodiments provide a system based on the measuring method of comparing with each other the electric power or amplitude of the signal received at the respective receiving stations as the system for making the location-confirming as precisely as possible with small number of receiving stations, and those embodiments further provide the transmitting method of the transmitter constructing the system and the receiving method of the receiver.

The tenth embodiment in connection with the second embodiment is explained hereinafter, which requires a plurality of bandpass filters for successively receiving the signals. In the embodiment, the location confirmation is performed intermittently, and thereby the construction of the receiver can be simplified.

And further, the eleventh embodiment in connection with the third embodiment requires a plurality of matched filters for successively receiving the signals. In the embodiment, the location confirmation is performed intermittently, and thereby the construction of the receiver can be simplified.

At first, the tenth embodiment according to the present invention is explained. FIG. 21 is a block diagram showing still another construction of the transmitter according to the present invention. In FIG. 21, the reference numeral 161 represents a receiving antenna, 162 a BPF, 163 an amplifier, 164 a multiplier, 165 an amplifier, 166 a BPF, 167 a square detector, 168 an integration dump filter, 169a through 169c counters, 170 a ROM, 171 a PLL synthesizer, 172 a peak-holding circuit, 173 an A-D converter, and 174 a data processing portion.

The bandpass filter of the front end portion has a bandwidth sufficiently wide for causing all of the signals to be measured (frequency of the signals; F1+fIF–Fn+fIF) to pass through. All of the received signals are frequency-converted to the intermediate frequency fIF. At this time, it is necessary to prepare the local oscillator employed for converting the frequency which can change over the frequency in order just like a PLL synthesizer 171 and supply the signal of stable frequency.

In FIG. 21, the PLL synthesizer 171 generates the signals of frequencies F1 through Fn in order. The frequency-converted signals are measured as the data of the electric power value through the square detector 167 and the integration dump filter 168. In the embodiment, although the electric power value is measured, the amplitude value can be measured also by the envelope detection.

The frequency of the signal emitted from the PLL synthesizer 171 can be changed over, for instance, by reading out the control data of the synthesizer written in the ROM 170 as shown in FIG. 21. The counter 169b counts the measuring time T of the respective signals (time of square detection and integration) from the standard clock. The output signal of the counter 169b becomes the trigger signal for the peak-holding circuit 172 and the A-D converter 173. When the trigger signal is outputted from the counter 169b, the electric power value of the receiving signal is memorized in the data processing portion 174 as the data. The signal is given a delayed time and resets the integration dump filter 168, and the same signal is inputted in the counter 169a at the same time.

The counter 169a gives the ROM 170 the signal of the address in which the data to be read out from the ROM 170 and applied to the PLL synthesizer 171 are accommodated.

To state simply here, n sorts of data are accommodated in the addresses 1 to n of the ROM 170, the counter 169a counts the output from the counter 169b for measuring the time period T from 0 to n−1, and the same outputs the address signal to the ROM 170. Since the signal to be measured may become again the signal to be firstly measured of the original frequency after measuring the time period (n×T), the counter 169a and the counter 169b have to cooperate.

In the embodiment, the counter 169c is further provided, and the counter measures the time period (n×T) by use of the standard clock employed in the counter 169b. The output signal emitted from the counter becomes the reset signal for resetting the counter 169a. And further, since the address information of the ROM 170 is outputted to the data processing portion 174, the electric power value of either one of the signals of the frequencies F1+fIF to Fn+fIF is added to the measured electric power value, and the added value of the electric power is sent to the central station through the communication network. The central station can determine the existing-area zone of the respective workers per each time period (n×T) by searching the measured value from the receiver of the respective zones.

According to the method of the present invention, since it is possible to discriminate the signal of the narrow bandpass filter at the receiver, the construction of the system can be made simplified. This is a merit of the present invention.

Figure 22:
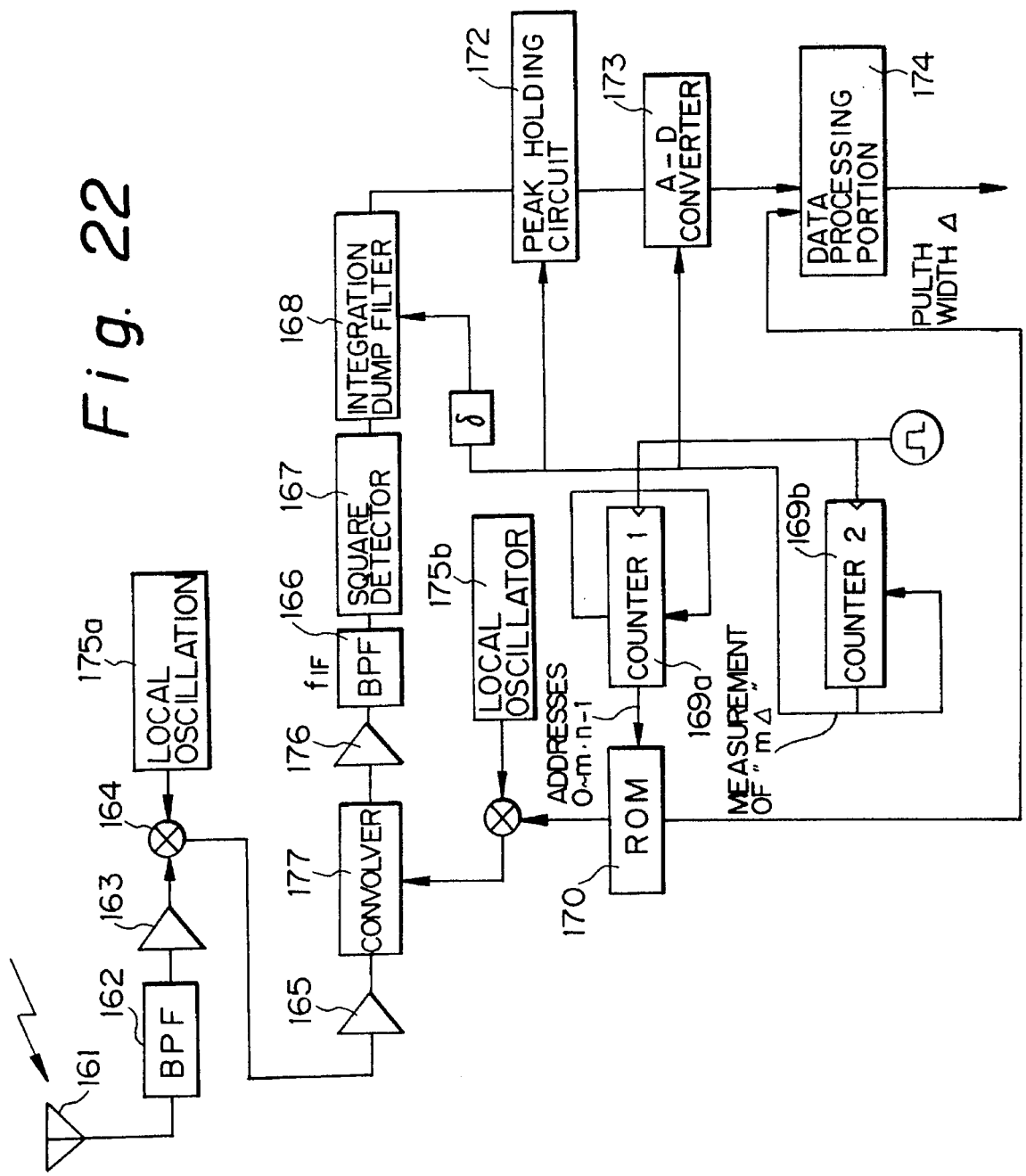
FIG. 22 is a block diagram showing still another construction of the receiver according to the present invention.
Figure 23:
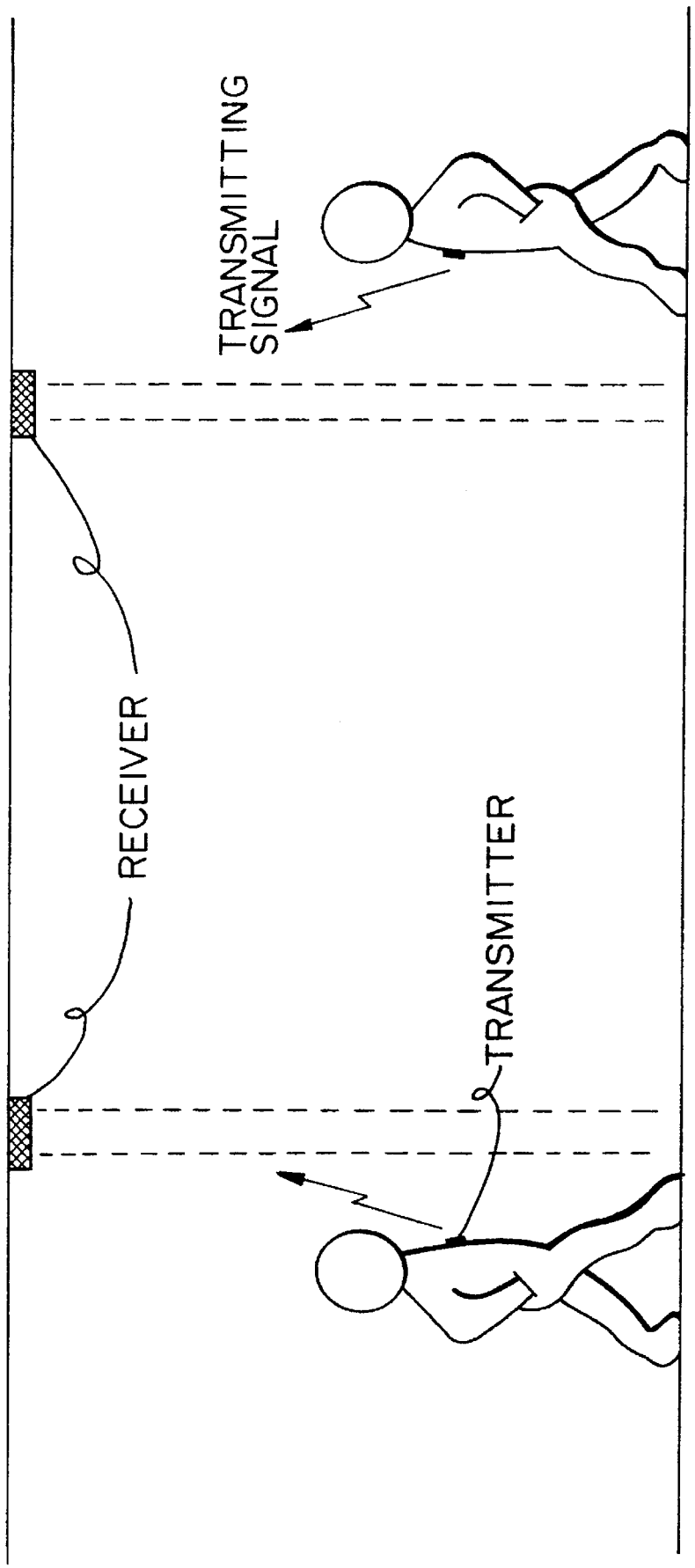
FIG. 23 is a conceptional diagram showing the conventional location confirming system.

Next, the eleventh embodiment of the present invention is explained. FIG. 22 is a block diagram showing still another construction of the receiver according to the present invention. In FIG. 22, the reference numerals 175a and 175b represent local oscillators, 176 an amplifier, and 177 a convolver. Same reference numerals are attached to the parts performing same function as that of FIG. 21.

The eleventh embodiment adopts the method of determining the existing-area zone of the workers by enabling the suspected noise code allocated to the respective workers to discriminate the signal from the transmitter transported by the respective workers.

The bandpass filter of the front end portion has the bandwidth sufficiently wide for causing the suspected noise signal to pass through. The received signal is frequency-converted, and thereafter it is inputted to convolver 177. Since the convolver 177 performs the bundle integration (convolution) for the two signals, one input is a receiving signal and another input is a reference PN signal, and thereby the output of the convolver 177 becomes equal to the correlative output signal. Consequently, in case that the PN1 is the reference signal for instance, the amplitude of the convolver's output signal becomes maximum at the time of receiving the PN1.

In such situation, the electric power value of the convolver's output signal is obtained by use of the square detector 167 and the integrator (integration dump filter) 168, the peak value thereof is held during one period of the suspected noise signal, and the amplitude value thereof is measured after one time period of the suspected noise signal. In such manner, the electric power value of the transmitting signal of the PN1 contained in the receiving signal (from the worker 1) can be known.

In the similar way, the signals from the respective objects can be measured in order, by changing over the PN signal from PN1 to PNn. In this embodiment, the PN signals are read out in order from the ROM 170. The counter 169b is the one for measuring the time period of the PN signal. The standard clock generator generates a clock signal having a frequency of the chip plate (chip width thereof; Δ). The counter 169b generates a signal after measuring the period of m×Δ. The generated signal becomes the trigger signal for the peak-holding circuit 172 and the A-D converter 173, and the δ-delayed signal of the same generated signal resets the integration dump filter 168. The counter 169a is the one for measuring the time period; n×m×Δ, and the same counter gives the address signal to the ROM 170 accommodating n sorts of PN code from PN1 to PNn.

In the embodiment, n sorts of PN codes are accommodated in the ROM 170 from the first address "0" to the final address "n×m−1" in order m-address by m-addresses. The counter 169a outputs the signal after measuring the time period; n×m×Δ, and the outputted signal resets the counter 169a. Thereby, the address signal to the ROM 170 turns out to be "0" address again. Such operation is repeated, thereafter. The address signal being accessed is outputted to the data processing portion 174 from the ROM 170 so as to know the subject PN signal. In the data processing portion 174, the signal is added to the data of the electric power value of the receiving signal. The adequate signal processing necessary for the communication is performed for the added signal as the subject data of the electric power signal, and thereafter the signal is sent to the central station through the communication network.

The central station can determine the existing-area of the respective workers per the value of "the time period of the PN signal in the PN code multiplied by the number of the subject workers", by searching the measurement value from the receiver of the respective zones in the central station.

According to the method of the present invention, since only one convolver can perform the measurement of the correlation output, it is not necessary to prepare the matched filters of the number same as that of the signal workers, and thereby the construction of the system becomes simple. This is a merit of the present invention.

As is apparent from the foregoing description, the following functional effects can be realized according to the present invention.

(1) Functional Effect corresponding to the first embodiment:

In the first embodiment, the electric power or amplitude of the signal emitted from the generator transported by the subject person or object is measured, and the existing-area zone is distinguished from each other by comparing the measured values with each other between the receivers installed per each other. Consequently, the confirmation of the location can be performed precisely with a small number of receivers.

(2) Functional Effect corresponding to the second embodiment:

In the second embodiment, since it is not necessary to modulate the transmitting signal from the object, the construction of the transmitter becomes simple. Furthermore, since the signal discrimination can be performed by the narrow bandpass filter, the construction of the receiver becomes also simple.

(3) Functional Effect corresponding to the third embodiment:

In the third embodiment, since the transmitting signal from the object employs the signal diffusedly-modulated in the same frequency by the suspected noise signal, a new transmitter can be constructed simply only by replacing the suspected noise signal generator by the new one, and the same can easily correspond to the increase/decrease in the number of the objects. And further, the receiver has also the same merits.

(4) Functional Effect corresponding to the fourth embodiment:

In the fourth embodiment, since the discrimination signal from the transmitter can be transmitted intermittently, the consumed electric power of the transmitter can be saved, and thereby the transmission can be kept up (sustained) for the longer time.

(5) Functional Effect corresponding to the fifth embodiment,

In the fifth embodiment, since the discrimination signal from the transmitter can be transmitted intermittently, the consumed electric power of the transmitter can be saved, and thereby the transmission can be kept up (sustained) for the longer time, and further the fact that the existing-area zone becomes indefinite during the time period of stopping the transmission can be avoided.

(6) Functional Effect corresponding to the sixth embodiment:

In the sixth embodiment, since it is sufficient to employ only one sort of the bandpass filter, the electric power measuring circuit, or the amplitude measuring circuit, and therefore the construction of the receiver becomes simple.

(7) Functional Effect corresponding to the seventh embodiment:

In the seventh embodiment, since the transmission of the signal from the respective transmitters shifts in time, the influence of the noise occurring due to the mutual correlation between the respective signals is reduced, and thereby the existing-area zone can be presumed more precisely.

(8) Functional Effect corresponding to the eighth embodiment:

In the eighth embodiment, since the transmission of the discrimination signal from the transmitter is performed randomly, the signals from the respective objects scarecely interferes with each other, and thereby the existing-area zone can be presumed more precisely.

(9) Functional Effect corresponding to the ninth embodiment:

In the ninth embodiment, since the overlapping time periods of the discrimination signals from the respective transmitters differ from each other per each measurement, the time of not-interferring with each other regarding the signals from the respective objects occurs easily, and thereby the existing-area can be presumed more precisely.

(10) Functional Effect corresponding to the tenth embodiment:

In the tenth embodiment, since only one narrow bandpass filter can discriminate the received signal, the construction of the receiver can be made simplified.

(11) Functional Effect corresponding to the eleventh embodiment:

In the eleventh embodiment, since only one convolver can discriminate the received signal, the construction of the receiver can be made simplified.

What is claimed is:

1. A location confirming system having movable objects existing in a limited area and carrying respective transmitters emitting respective signals, comprising:

means for monitoring and receiving the respective signals at a plurality of receiving stations arranged respectively in zones using only a unidirectional signal path from said transmitters to said receiving stations, and means for determining one of said zones in which one of said transmitters is present by comparing magnitudes of electric power of said signals with each other at said respective receiving stations.

2. A location confirming system having movable objects existing in the limited area and carrying respective transmitters emitting the respective signals as defined in claim 1, wherein said system further comprises:

means for allocating in each of said zones a carrier wave which is successively transmitted by said respective objects, said carrier waves having different frequencies, and filters of a number equal to that of the allocated frequency prepared in said receiving stations of the respective zones in said system, the signals from said each object are separated from each other, and a zone in which said object exists is determined by comparing the respective electric powers or amplitudes of said received signals with each other between said respective stations.

3. A location confirming system having movable objects existing in the limited area and carrying respective transmitters emitting the respective signals as defined in claim 2, wherein said system further comprises:

first means for determining an existing-area zone in which a carrier wave of same frequency is employed, a signal diffusively modulated with a suspected noise code unique to each said object is emitted from each of said transmitters carried by said respective objects and is successively transmitted, a suspected noise signal same as a suspected noise code allocated to each of said respective objects at said receiving stations of said each zone is calculated correlatively as a reference signal for each said zone, and a zone in which said object exists is determined by comparing the magnitudes of said suspected noise signals for each signal with each other between said respective receiving stations.

4. A location confirming system having movable objects existing in the limited area and carrying respective transmitters emitting the respective signals as defined in claim 2, wherein said system further comprises:

transmitting means for operating intermittently said transmitter carried by said each object and employing said means for allocating at a time interval corresponding to a time required for said measured object to move in said zone.

5. A location confirming system having movable objects existing in the limited area and carrying respective transmitters emitting the respective signals as defined in claim 2, wherein said system is a receiving station of said location confirming system by use of said means for allocating and employing a transmitting means for operating intermittently said transmitter carried by said each object at a time interval corresponding to a time required for said measured object to move in said zone, and said system further comprises receiving means for determining an existing-area zone capable of measuring the electric power or amplitude of said signal only during the time period of transmitting said signal.

6. A location confirming system having movable objects existing in the limited area and carrying respective transmitters emitting the respective signals as defined in claim 1, wherein said system further comprises:

means for determining an existing-area zone in which discrimination data inherent in said respective objects are allocated, a carrier wave of same frequency as that of the data is modulated with an optional modulating method by said discrimination data as the signal transmitted by said respective objects is employed, said respective objects transmit intermittently said discrimination data signal for each object at different time intervals, said receiving station of said each zone demodulates said modulated signal, takes out said discrimination data, and discriminates said received signal, and a zone in which said object exists is determined by comparing electric power or amplitudes of said received signals with each other.

7. A location confirming system having movable objects existing in the limited area and carrying respective transmitters emitting the respective signals as defined in claim 3, wherein said system further comprises:

intermittent transmitting means for operating intermittently said transmitter carried by said each object at a time interval corresponding to a time required for said measured object to move in said zone, means for setting the transmitting time intervals of the signals emitted from each said object to different time intervals for each of said respective objects.

8. A location confirming system having movable objects existing in the limited area and carrying respective transmitters emitting the respective signals as defined in claim 1, wherein said system further comprises:

receiving means for determining an existing-area zone capable of measuring the electric power or amplitude of said signal only during a time period of transmitting said signal, and transmitting means for said discrimination signal for controlling the time point of starting the transmission from said transmitter carried by said each object so as to change in time during a predetermined constant time period.

9. A location confirming system having movable objects existing in the limited area and carrying respective transmitters emitting the respective signals as defined in claim 1, wherein said system further comprises:

receiving means for determining an existing-area zone capable of measuring the electric power or amplitude of said signal only during a time period of transmitting said signal, and transmitting means for said discrimination signal for controlling the transmission time from said transmitter carried by said object so as to change in time during a predetermined constant time period.

10. A location confirming system in which a movable object existing in a limited area carries a transmitter emitting respective signals unique to each transmitter, wherein said respective signals are monitored and received at plural receiving stations arranged in zones using only a unidirectional signal path from said transmitters to said receiving stations, and a zone in which said transmitter carried by each object exists is determined by comparing the respective magnitudes of the received signal power with each other at said respective receiving stations, said system comprises existing-area zone determining means having a local oscillator which allocates and successively transmits carrier waves of different frequencies corresponding to the respective signals to be transmitted by each object, said receiving station comprises a frequency convertor for frequency-converting received signals to a constant intermediate frequency, the signals from said respective objects are separated from each other by changing over the frequency at an optional timing, and the zone in which said object exists is determined by comparing the electric power or amplitudes of said received signals with each other for each signal.

11. A location confirming system as defined in claim 10, wherein said system comprises existing-area zone determining means in which a carrier wave of same frequency is employed, a signal diffusively modulated with the suspected noise code inherent in said each object is successively transmitted from said transmitter carried by said each object, a set of reference signal generator included in said system generates all suspected noise codes allocated to said each object at said receiving station of said each zone, a reference signal generator is changed at an optional time interval, correlative calculation is performed in order, and the zone in which said each object exists is determined by comparing the magnitudes of said respective suspected noise signal with each other for each signal between said respective receiving stations.

12. A transmitter location confirming system having movable objects existing in a limited area and carrying respective transmitters emitting respective signals, wherein said system comprises:

means for monitoring and receiving the respective signals at a plurality of receiving stations arranged in zones using only a unidirectional signal path from said transmitters to said receiving stations, and means for determining said zone in which said transmitter owned by said each object exists by comparing the magnitudes of the electric power of said respective signals received at said respective receiving stations with each other.

13. A transmitter location confirming system having movable objects existing in the limited are and carrying respective transmitters emitting the respective signals as defined in claim 12, wherein said system further comprises:

means for allocating carrier waves of different frequencies and successively transmitting said carrier waves as said respective signals transmitted by said respective objects, and filters of a number equal to that of the allocated frequency are prepared in said receiving stations of the respective zones in said system, the signals from said each object are separated from each other, and a zone in which said object exists is determined by comparing the respective electric power or amplitude of said received signals with each other.

14. A transmitter location confirming system having movable objects existing in the limited area and carrying respective transmitters emitting the respective signals as defined in claim 12, wherein said system further comprises:

means for allocating a carrier wave of one frequency, a signal diffusively modulated with a suspected noise code inherent in said each object emitted from said transmitter carried by said respective objects is successively transmitted, a suspected noise signal the same as a suspected noise code allocated to said respective objects at said receiving station of said each zone is calculated correlatively as a reference signal, and a zone in which said object exists is determined by comparing the magnitudes of said suspected noise signals for each signal with each other.

15. A transmitter location confirming system having movable objects existing in the limited area and carrying respective transmitters emitting respective signals as defined in claim 13, wherein said system further comprises:

transmitting means for operating intermittently said transmitter carried by said each object employing said means for allocating at a time interval corresponding to the time required for said measured object to move in said zone.

16. A transmitter location confirming system having movable objects existing in the limited area and carrying respective transmitters emitting the respective signals as defined in claim 12, wherein said system is a receiving station of said location confirming system by use of said means for allocating and employing transmitting means for operating intermittently said transmitter carried by said each object at a time interval corresponding to the time required for said measured object to move in said zone, and said system further comprises receiving means for determining an existing-area zone capable of measuring the electric power or amplitude of said signals only during the time period of transmitting said signals.

17. A transmitter location confirming system having movable objects existing in the limited area and carrying respective transmitters emitting the respective signals as defined in claim 12, wherein said system further comprises means for determining an existing-area zone in which discrimination data inherent in said respective objects are allocated, a carrier wave having a frequency the same as that of the data modulated with an optional modulating method by said discrimination data as the signal transmitted by said respective objects is employed, said respective objects transmit intermittently said discrimination data signal for each object at different time intervals, said receiving station of said each zone demodulates said modulated signal, takes out said discrimination data, and discriminates said received signal, and a zone in which said object exists is determined by comparing the electric power or amplitude of said received signals with each other for each signal.

18. A transmitter location confirming system having movable objects existing in the limited area and carrying respective transmitters emitting the respective signals as defined in claim 16, wherein said system further comprises transmitting means for setting the transmitting time intervals of the signals emitted from said each object to different time intervals for said respective objects.

19. A transmitter location confirming system having movable objects existing in the limited area and carrying respective transmitters emitting the respective signals as defined in claim 16, wherein said system further comprises transmitting means for said discrimination signal for controlling the time point of starting the transmission from said transmitter carried by said each object so as to change in time during a predetermined constant time period.

20. A transmitter location confirming system having movable objects existing in the limited area and carrying respective transmitters emitting the respective signals as defined in claim 16, wherein said system further comprises:

transmitting means for a discrimination signal for controlling a transmission time from said transmitter carried by each object so as to change with time during a predetermined constant time period.

21. A transmitter location confirming system in which a movable object existing in a limited area carries a transmitter emitting respective signals unique to each transmitter, wherein said respective signals are monitored and received at plural receiving stations arranged in zones using only a unidirectional signal path from said transmitters to said receiving stations, and a zone in which said transmitter carried by each object exists is determined by comparing with each other the respective magnitudes of the power of the respective signals received at said respective receiving stations, said system comprises existing-area zone determining means having a local oscillator which allocates and successively transmits carrier waves of different frequencies corresponding to said respective signals transmitted by each object, said receiving station comprises a frequency convertor for frequency-converting received signals to a constant intermediate frequency, the signals from said respective objects are separated from each other by changing over the frequency at an optional timing, and the zone in which said object exists is determined by comparing the electric power or amplitude of said received signals with each other for each signal.

22. A transmitter location confirming system as defined in claim 21, wherein said existing-area zone determining means employs a carrier wave of one frequency, a signal diffusively modulated with a suspected noise code unique to said each object is successively transmitted from said transmitter carried by said each object, a set of reference signal generators included in said system generates all suspected noise codes allocated to said each object at said receiving station of said each zone, a reference signal generator is changed at an optional time interval, correlative calculation is performed in order, and the zone in which said each object exists is determined by comparing the magnitudes of said respective suspected noise signals with each other for each signal.

23. A location confirming system as defined in claim 1, comprising a plurality of said receivers being disposed in a single building structure.

24. A location confirming system as defined in claim 23, wherein said building structure is one of an office and a factory.

25. A location confirming system as defined in claim 1, comprising a local area network interconnecting said receivers.

* * * * *